US012738122B2

(12) United States Patent
(10) Patent No.: US 12,738,122 B2
(45) Date of Patent: Sep. 15, 2026

Sato et al.

(54) LOCKER APPARATUS

(71) Applicant: TOKAI RIKEN CO., LTD., Seki (JP)

(72) Inventors: Akihiro Sato, Seki (JP); Yoshiaki Muto, Seki (JP); Masami Umemura, Seki (JP); Risa Yonenuma, Seki (JP); Yasufumi Ichihara, Tokyo (JP)

(73) Assignee: TOKAI RIKEN CO., LTD., Seki (JP)

( * ) Notice: Subject to any disclaimer, the term of this patent is extended or adjusted under 35 U.S.C. 154(b) by 20 days.

(21) Appl. No.: 18/917,156

(22) Filed: Oct. 16, 2024

(65) Prior Publication Data

US 2025/0259499 A1 Aug. 14, 2025

(30) Foreign Application Priority Data

Feb. 8, 2024 (JP) ................................. 2024-018011

(51) Int. Cl.
*G07F 17/12* (2006.01)
*G07C 9/00* (2020.01)
(Continued)

(52) U.S. Cl.
CPC ......... *G07F 17/12* (2013.01); *G07C 9/00571* (2013.01); *G07C 9/00698* (2013.01);
(Continued)

(58) Field of Classification Search
CPC . G07F 17/12; G07C 9/00571; G07C 9/00698; G07C 9/00896; G07C 9/21; G07C 9/22; G07C 9/27; G07C 2209/08
See application file for complete search history.

(56) References Cited

U.S. PATENT DOCUMENTS 5,126,732 A * 6/1992 Mardon .................. G07F 17/13 340/5.9
2010/0283361 A1* 11/2010 Sato .................. G07C 9/00896 70/280

(Continued)

FOREIGN PATENT DOCUMENTS

CN 105869306 A 8/2016
CN 115244263 A 10/2022

(Continued)

OTHER PUBLICATIONS

May 15, 2026 Search Report issued in Singaporean Patent Application No. 10202403364X.

(Continued)

*Primary Examiner* — Mohamed Barakat
(74) *Attorney, Agent, or Firm* — Oliff PLC

(57) ABSTRACT

In a locker apparatus, an operation unit includes authentication means, and a control device locks a locking device in order to bring a door into a closed state except when luggage is deposited in a box and when the luggage is taken out from the box. The operation unit includes a reopening door button for giving an instruction to reopen the door. When the reopening door button is operated within 15 minutes after the luggage is deposited in the box, the door is closed, and the locking device is locked once, the control device unlocks the locking device, on a condition that authentication by the authentication means is established, in order to permit the door to be reopened, and locks the locking device again when the door is closed thereafter.

13 Claims, 26 Drawing Sheets

(51) Int. Cl.
*G07C 9/21* (2020.01)
*G07C 9/22* (2020.01)
*G07C 9/27* (2020.01)

(52) U.S. Cl.
CPC ........... *G07C 9/00896* (2013.01); *G07C 9/21* (2020.01); *G07C 9/22* (2020.01); *G07C 9/27* (2020.01); *G07C 2209/08* (2013.01)

(56) References Cited

U.S. PATENT DOCUMENTS

| | | | | |
|---|---|---|---|---|
| 2014/0316918 | A1* | 10/2014 | Zaniker | G07F 5/26 705/21 |
| 2016/0133074 | A1* | 5/2016 | Amdahl | G07C 9/00571 340/5.54 |
| 2022/0027160 | A1* | 1/2022 | Fetterman | G06F 12/0846 |
| 2022/0122393 | A1* | 4/2022 | Park | G07C 9/00571 |
| 2022/0189228 | A1* | 6/2022 | Pirch | G07C 9/00309 |
| 2023/0068391 | A1 | 3/2023 | Norieda et al. | |
| 2024/0346574 | A1* | 10/2024 | Ishida | G07F 17/14 |

FOREIGN PATENT DOCUMENTS

| | | | |
|---|---|---|---|
| JP | 3113126 | U | 9/2005 |
| JP | 3113263 | U | 9/2005 |
| JP | 2007102275 | A | 4/2007 |
| JP | 2018033851 | A | 3/2018 |
| JP | 3220448 | U | 3/2019 |
| JP | 2022177568 | A | 12/2022 |
| JP | 2023148232 | A | 10/2023 |
| KR | 101127900 | B1 | 3/2012 |

OTHER PUBLICATIONS

May 15, 2026 Written Opinion issued in Singaporean Patent Application No. 10202403364X.

Jun. 2, 2026 Office Action issued in Chinese Patent Application No. 202411523153.4.

Jul. 21, 2026 Office Action issued in Japanese Patent Application No. 2024-018011.

* cited by examiner

FIG. 11
22
Thank you for using our service.

FIG. 20
22
Thank you for using our service.

LOCKER APPARATUS

CROSS-REFERENCE TO RELATED APPLICATIONS

This application is based upon and claims the benefit of priority from the prior Japanese Patent Application No. 2024-018011, filed Feb. 8, 2024, the entire contents of which are incorporated herein by reference.

BACKGROUND

Technical Field

The technique disclosed in this specification relates to a locker apparatus that includes a box capable of accommodating luggage therein, a door for opening and closing the box, and a locking device for unlockably locking the door.

Related Art

Conventionally, as this type of technique, for example, the techniques described in Japanese Utility Model Registration No. 3113126 (JP3113126U), Japanese Utility Model Registration No. 3113263 (JP3113263U), and Japanese Utility Model Registration No. 3220448 (JP3220448U) have been known. JP3113126U, JP3113263U, and JP3220448U each describe technique related to a normally closed-type coin locker that provisionally locks each door at all times when not in use.

Generally, conventional coin lockers are normally opened-type coin lockers in which each door is not locked when no luggage is deposited therein. Therefore, rubbish is sometimes thrown into boxes, or the boxes are sometimes used as luggage storage areas without permission, so that there are problems in terms of hygiene and crime prevention, and installation companies are forced to manage and handle these problems. In contrast, in each of the normally closed-type coin lockers described in JP3113126U, JP3113263U, and JP3220448U, each door is provisionally locked even when no luggage is deposited therein, which can reduce the burden of the above management and handling.

In recent years, as normally closed-type coin lockers, a type of locker apparatus in which a locking device is electrically activated and operated to be locked and unlocked without using a physical key, has become the mainstream. For example, a user checks an available box by a number at an operation unit provided in a locker apparatus, designates the number, and performs a payment operation for a usage fee. JP3113126U and JP3113263U each describe a payment method by cash, and JP3220448U describes a payment method by a credit card or the like. When the locker apparatus confirms payment of the usage fee in response to this payment operation, the locking device of the designated box is unlocked, the door opens, and it becomes possible to deposit luggage. When the user deposits luggage, closes the door, and confirms the operation, the locking device is locked. When the luggage is deposited as described above, a note on which the number of the designated box is recorded is issued to the user for convenience in taking out the luggage. For example, JP3113126U and JP3113263U each state that in depositing luggage, a receipt with a bar code is issued as a note from the locker apparatus, and in taking out the luggage, the user is authenticated by holding the issued receipt over a bar code reader, the locking device of the designated box is unlocked, and the door is opened. Meanwhile, JP3220448U states that by using a two-dimensional code such as a serial number code, a bar code, or a QR code (registered trademark) instead of a receipt, the user is authenticated and the locking device is unlocked.

SUMMARY

Technical Problems

In each of the normally closed-type locker apparatuses described in JP3113126U, JP3113263U, and JP3220448U, when the user deposits luggage in the box and the door is closed, the locking device is locked and the door is locked into a closed state. At this time, for example, the user may wish to take out luggage or the like unintentionally left in the box, or may wish to redeposit other luggage. In this case, the user has to unlock the locking device of the box in which the luggage has already been deposited, and open the door again. In this case, in the conventional normally closed-type locker apparatus, it is necessary to perform an operation for taking out the luggage on an operation unit.

However, in the conventional normally closed-type locker apparatus, in order to close and lock the door again after luggage is taken out, it is necessary to perform an operation for depositing luggage again, which forces the user to pay a usage fee again. In this case, if it is immediately after depositing the luggage, this does not mean that the box has actually stored the luggage therein. For the convenience of users, it is therefore desirable to provide a locker apparatus that allows a door of a box to be reopened once without having to pay a usage fee again.

The disclosed technique has been made in view of the above circumstances, and an object of the disclosed technique is to provide a locker apparatus that allows a user to redeposit luggage immediately after completing an operation for depositing luggage, without forcing the user to bear the burden of a new usage fee.

Means of Solving the Problems (1) In order to achieve the above object, one aspect of the disclosed technique is directed to a locker apparatus including: a box capable of accommodating luggage therein; a door configured to open and close the box; a locking device configured to unlockably lock the door; an operation unit configured to receive an operation by a user; and a control device configured to control the locking device in response to an operation on the operation unit by the user, wherein the operation unit includes authentication member configured to authenticate the user, the control device is configured to lock the locking device in order to lock the door into a closed state except when the luggage is deposited in the box and when the luggage is taken out from the box, the operation unit includes a reopening door button that can be operated by the user in order to give an instruction to reopen the door, and when the reopening door button is operated within a predetermined time after the luggage is deposited in the box, the door is closed, and the locking device is locked once, the control device unlocks the locking device, on a condition that authentication of the user by the authentication member is established, in order to permit the door to be reopened, and locks the locking device again when the door is closed thereafter.

According to the above configuration (1), on a condition that the reopening door button is operated within the predetermined time after the luggage is deposited in the box, the door is closed, and the locking device is locked once, and authentication of the user by the authentication member is established, the locking device is unlocked in order to permit the door to be reopened, and when the door is closed thereafter, the locking device is locked again. Therefore, for example, when the user takes out unintentionally left luggage or the like or redeposits the luggage immediately after depositing the luggage, reopening of the door by unlocking and locking after the door is closed again are performed, without paying a usage fee, on the condition that the reopening door button is operated within the predetermined time and authentication of the user is established.

(2) In order to achieve the above object, according to the above configuration (1), preferably: the operation unit includes a display unit configured to display at least one of a virtual button, an illustration of a locker apparatus, and a text; the control device is configured to cause a screen of the display unit to sequentially transition from a standby screen in response to an operation on the virtual button by the user; as the virtual button, a deposit button that is operated by the user when the user deposits the luggage in the box, a take-out button that is operated by the user when the user takes out the luggage from the box, and the reopening door button are displayed on the standby screen; the reopening door button is a button that is operated by the user particularly when the user redeposits the luggage in the box, not when the user takes out the luggage from the box; and on the standby screen, the deposit button and the take-out button are displayed side by side, and the reopening door button is placed adjacent to an upper side of the take-out button and is smaller in size than the take-out button.

According to the above configuration (2), in addition to the action of the above configuration (1), on the standby screen, the deposit button and the take-out button as the virtual buttons are displayed side by side, and the reopening door button is placed adjacent to the upper side of the take-out button and is smaller in size than the take-out button. Here, the deposit button which is frequently used is used for an operation in depositing the luggage, and the take-out button which is frequently used is used for an operation in taking out the luggage, so that the uses of the deposit button and the take-out button are different from each other, and there is little risk of selecting a wrong button at the time of operation. In contrast, although the reopening door button is used less frequently, the reopening door button is used for an operation in redepositing the luggage, and the use thereof is similar to that of the take-out button, so that there is a risk of selecting a wrong button from the reopening door button and the take-out button at the time of operation. With the above configuration, since the reopening door button is placed adjacent to the upper side of the take-out button and is smaller in size than the take-out button, the take-out button is more conspicuous than the reopening door button and is easily distinguished from the reopening door button, so that there is less risk of selecting a wrong button when operating one of these buttons.

(3) In order to achieve the above object, in the above configuration (2), preferably, when the reopening door button is operated, the control device causes a display of the display unit to transition from the standby screen to a confirmation screen, and an explanation text "You can redeposit luggage within a predetermined time after deposit", an elapsed time after the deposit, and a confirmation button as the virtual button are displayed on the confirmation screen.

According to the above configuration (3), in addition to the action of the above configuration (2), when the reopening door button is operated, the display of the display unit transitions from the standby screen to the confirmation screen, and an explanation text "You can redeposit luggage within a predetermined time after deposit", and the elapsed time after the deposit are displayed on this confirmation screen. Therefore, the user can check the content of the selected operation and the remaining time for which the operation is possible.

(4) In order to achieve the above object, in the above configuration (3), preferably, when the confirmation button is operated, the control device causes the display of the display unit to transition from the confirmation screen to an authentication selection screen, and a text "Redeposit luggage" and a plurality of types of authentication buttons for selecting one of a plurality of authentication methods are displayed on the authentication selection screen.

According to the above configuration (4), in addition to the action of the above configuration (3), when the confirmation button is operated, the display of the display unit transitions from the confirmation screen to the authentication selection screen, and a text "Redeposit luggage" is displayed on the authentication selection screen, so that the user can confirm that the user has shifted to an operation such as redeposit of the luggage, rather than take-out of the luggage. In addition, since the plurality of types of authentication buttons for selecting one of the plurality of authentication methods are displayed, the user's operation for entering an authentication method is simplified.

(5) In order to achieve the above object, in the above configuration (4), preferably, when one of the authentication buttons is operated, the control device causes the display of the display unit to transition from the authentication selection screen to an authentication execution screen, and the authentication member or an illustration prompting an operation on the authentication member corresponding to the selected one authentication method, and an explanation text therefor are displayed on the authentication execution screen.

According to the above configuration (5), in addition to the action of the above configuration (4), when one of the authentication buttons is operated, the display of the display unit transitions from the authentication selection screen to the authentication execution screen, and the authentication member or the illustration prompting an operation on the authentication member corresponding to the selected one authentication method and the explanation text therefor are displayed on the authentication execution screen, so that it becomes easier for the user to perform the operation for performing authentication.

(6) In order to achieve the above object, in the above configuration (5), preferably, the door is provided with operation member that is operated by the user in order to request the locking device to lock when the user has deposited the luggage in the box and has closed the door; when the authentication member is operated, the control device causes the display of the display unit to transition from the authentication execution screen to a box selection screen; and a number corresponding to the box in which the user has deposited the luggage, a selection button that can be operated in order to select the number, an explanation text prompting an operation on the operation member after the luggage is deposited again, and an illustration for the operation on the operation member are displayed on the box selection screen.

According to the above configuration (6), in addition to the action of the above configuration (5), when the authentication member is operated, the display of the display unit transitions from the authentication execution screen to the box selection screen, and the number corresponding to the box in which the user has deposited the luggage and the selection button that can be operated to select this number are displayed on the box selection screen, so that it becomes easier for the user to select the box in which the user has deposited the luggage. In addition, since the operation that should be performed by the user on the operation member after the user deposits the luggage again (redeposits the luggage) is prompted with an illustration, the user is prevented from forgetting to operate the operation member, and is prevented from forgetting to close and lock the door.

(7) In order to achieve the above object, in the above configuration (6), preferably, when the operation member is operated, the control device causes the display of the display unit to transition from the box selection screen to an end screen, and a text "Thank you for using our service" is displayed on the end screen.

According to the above configuration (7), in addition to the action of the above configuration (6), when the operation member is operated, the display of the display unit transitions from the box selection screen to the end screen, and the text "Thank you for using our service" is displayed on the end screen, so that the user is notified of the end of redeposit of the luggage.

(8) In order to achieve the above object, in the above configuration (1) or (3) above, preferably, the predetermined time for permitting the door to be reopened is 15 minutes after the locking device is locked once.

According to the above configuration (8), in addition to the action of the above configuration (1) or (3), the 15-minute period can be a sufficient time for taking out luggage, etc., left behind and for redepositing luggage.

(9) In order to achieve the above object, in the above configuration in (1) or (3), preferably, the control device is configured to permit the door to be reopened multiple times within the predetermined time.

According to the above configuration (9), in addition to the action of the above configuration (1) or (3), since the door is permitted to be reopened multiple times within the predetermined time, it is possible to redeposit the luggage multiple times as needed by the user.

(10) In order to achieve the above object, in the above configuration (1) or (6), preferably, if there are a plurality of the boxes in which the luggage has been deposited by the same user, the control device unlocks the locking device corresponding to only the box selected through an operation on the operation unit.

According to the above configuration (10), in addition to the action of the above configuration (1) or (6), if there are a plurality of the boxes in which the same user has deposited the luggage, by selecting a target box through an operation on the operation unit, the locking device corresponding to only the selected box is unlocked, so that it is possible to limit redeposit of the luggage to only the specific box.

According to the above configuration (1), immediately after the operation for depositing the luggage is completed, redeposit of the luggage, etc., can be performed without forcing the user to bear the burden of a new usage fee.

According to the above configuration (2), in addition to the effect of the above configuration (1), it is possible to reduce a situation in which the user selects and operates a wrong one out of the reopening door button and the take-out button and performs operation from the beginning.

According to the above configuration (3), in addition to the effect of the above configuration (2), after the reopening door button is operated, the user can be prompted to complete redeposit of the luggage or the like within the predetermined time, so that it is possible to reduce a mistake of the user trying to continue operation.

According to the above configuration (4), in addition to the effect of the above configuration (3), after operating the confirmation button, the user can select an authentication method in a short time.

According to the above configuration (5), in addition to the effect of the above configuration (4), after operating the authentication buttons, the user can perform authentication in a short time.

According to the above configuration (6), in addition to the effect of the above configuration (5), the user can specify the box in which the user is to redeposit the luggage, in a short time, and can more assuredly lock the door of this box after redepositing the luggage.

According to the above configuration (7), in addition to the effect of the above configuration (6), the user can confirm the completion of the operation for redepositing the luggage.

According to the above configuration (8), in addition to the effect of the above configuration (1) or (3), it is possible to provide the user of the locker apparatus with a convenience that is effective in terms of time.

According to the above configuration (9), in addition to the effect of the above configuration (1) or (3), it is possible to provide the user of the locker apparatus with a convenience that is effective in terms of the number of times.

According to the above configuration (10), in addition to the effect of the above configuration (1) or (6), it is possible to provide the user of the locker apparatus with an effective convenience without any loss of operation.

DETAILED DESCRIPTION OF THE EXEMPLARY EMBODIMENTS

Hereinafter, embodiments in which the locker apparatus of the disclosed technique is embodied will be described in detail with reference to the drawings.

First Embodiment

First, a first embodiment will be described.

(Outline of Configuration of Locker Apparatus)

Figure 1:
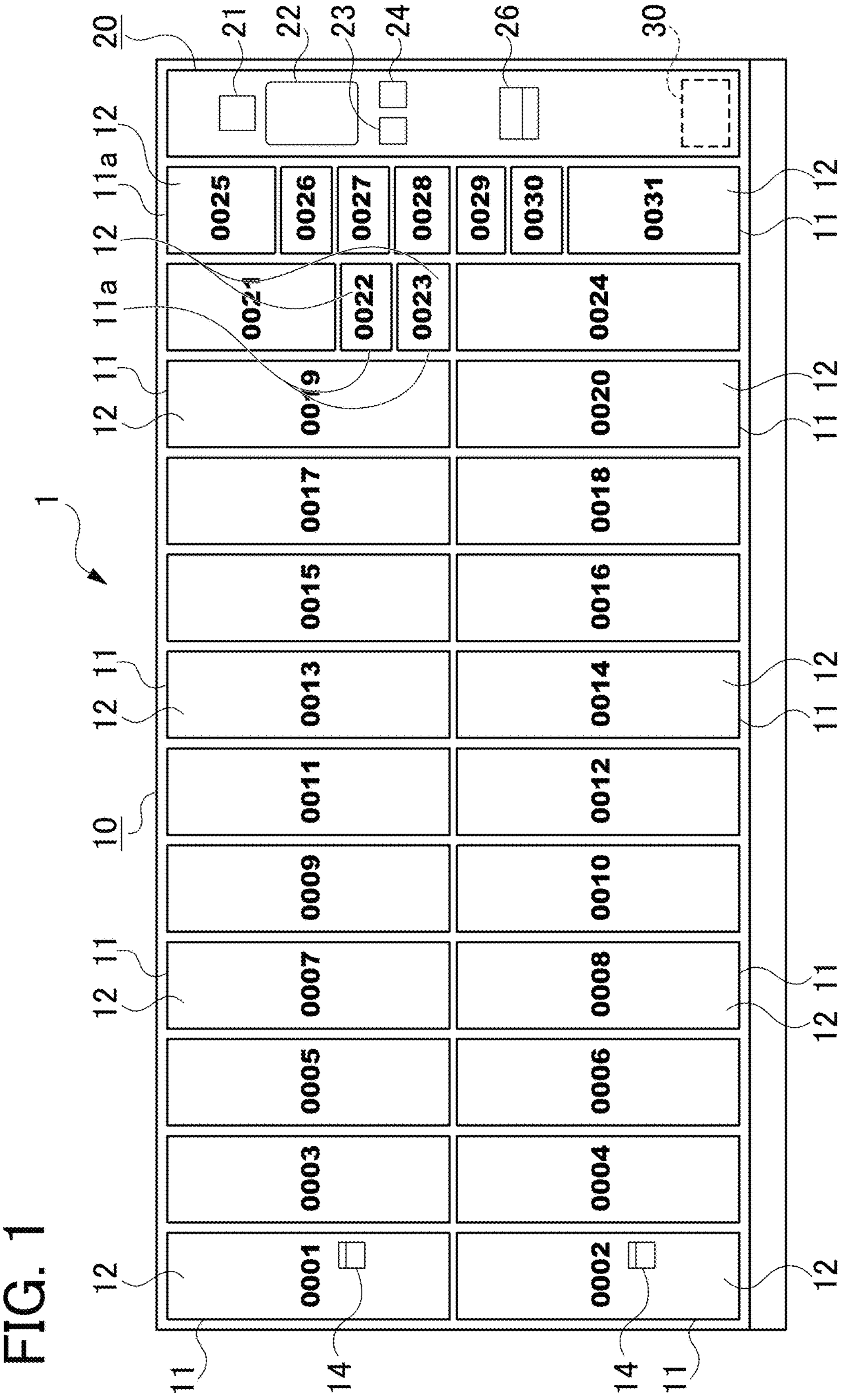
FIG. 1 is a front view showing a locker apparatus according to a first embodiment.
Figure 2:
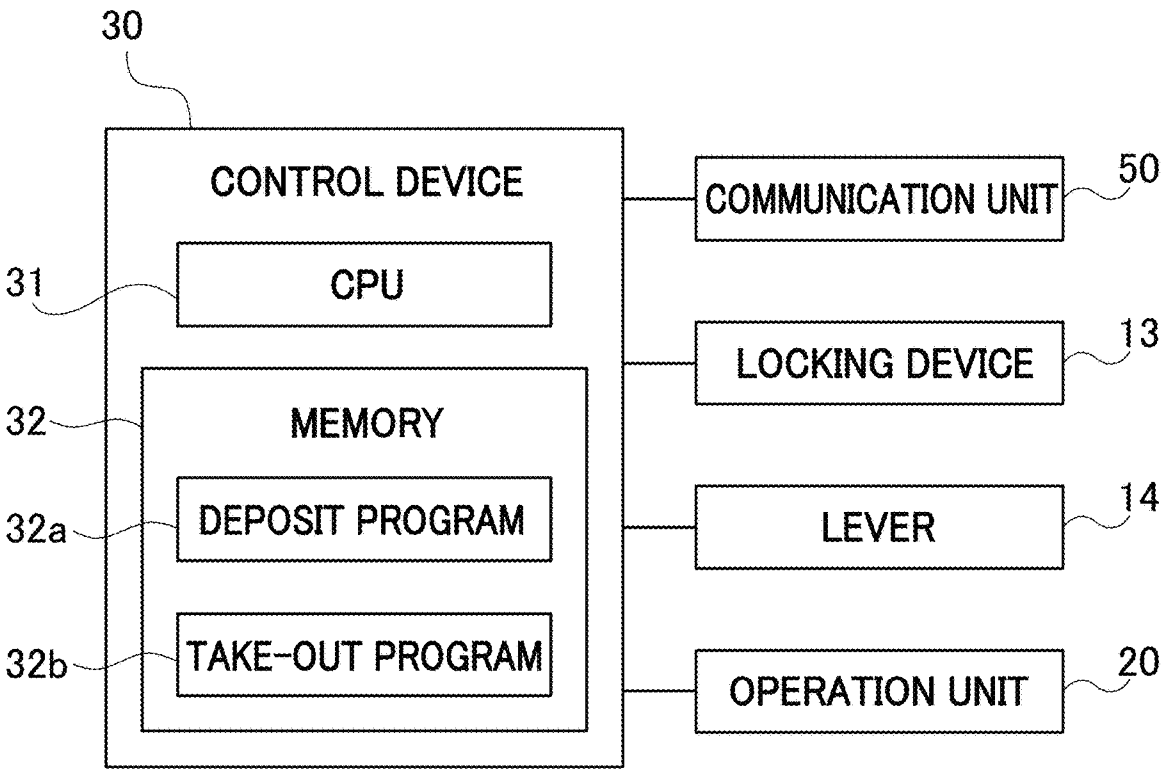
FIG. 2 is a block diagram showing the electrical configuration of the locker apparatus according to the first embodiment.

FIG. 1 shows a locker apparatus 1 in a front view. FIG. 2 shows the electrical configuration of the locker apparatus 1 in a block diagram. The locker apparatus 1 of this embodiment is installed on the premises of a railroad station and used to temporarily deposit and keep luggage, for example.

As shown in FIG. 1, the locker apparatus 1 includes a housing 10, a plurality of boxes 11 that are capable of accommodating luggage in the housing 10, an operation unit 20 for receiving an operation by a user in order for the user to place or take out luggage in or from a box 11, and a control device 30 that controls opening/closing, locking/unlocking, etc., of each box 11 and display, etc., of the operation unit 20 in response to operations on the operation unit 20 by the user.

(Configuration of Boxes)

As shown in FIG. 1, the locker apparatus 1 includes the plurality of boxes 11 each capable of accommodating luggage of the user therein. Specifically, as shown in FIG. 1, the locker apparatus 1 schematically includes a total of 24 boxes 11 in 2 rows×12 columns, and the two rightmost columns on the upper row and the rightmost one column on the lower row in FIG. 1 include a plurality of small boxes 11*a* each having a small frontage. The numbers of boxes 11 and small boxes 11*a* of this embodiment are merely an example, and can be increased or decreased as necessary. In addition, the locker apparatus 1 of this embodiment includes the plurality of boxes 11 and small boxes 11*a* having different frontages as shown in FIG. 1, but all of the plurality of boxes can also be configured with the same frontage.

At the front opening of each box 11 or 11*a*, a door 12 that can be opened and closed independently for each box 11 or 11*a* is provided. A box number (0001 to 0031) is attached to the surface of each door 12 to specify the corresponding box 11 or 11*a*. In this embodiment, each door 12 is, for example, a left-opening door that opens to the left of the box 11 or 11*a* in the drawing, but may also be a right-opening door that opens to the right of the box 11 or 11*a* in the drawing. A locking device 13 (see FIG. 2) described later is provided inside each box 11 or 11*a*. In this embodiment, the description of the specific configuration of the locking device 13 is omitted.

The door 12 of each box 11 or 11*a* is provided with a lever 14 that is operated by the user in order to request the locking device 13 to lock when the user has deposited luggage in the box 11 or 11*a* and has closed the door 12. In FIG. 1, for convenience, the levers 14 are shown only on the doors 12 with door numbers of "0001" and "0002", but not shown on the other doors 12. The levers 14 correspond to an example of "operation member" of the disclosed technique.

(Configuration of Operation Unit)

As shown in FIG. 1, the operation unit 20 includes a camera 21 for recognizing users, a display unit 22 with a liquid crystal screen for exchanging information with users, a QR code reader 23 for reading data such as QR codes (registered trademark) from users, a settlement terminal 24 that can read IC tags incorporated into cash cards, and a printer 26 for printing a receipt or the like for proof of use. Data input from users can be performed using the QR code reader 23 and the settlement terminal 24. Here, a cash card is, for example, a card that allows settlement of electronic money, such as a transportation IC card. The display unit 22, the QR code reader 23, and the settlement terminal 24 of the operation unit 20 correspond to an example of "authentication member" of the disclosed technique. The display unit 22 is configured to display at least one of a virtual button, an illustration of a locker apparatus, and a text, as described later.

(Configuration of Control Device)

The control device 30 is provided inside the operation unit 20, and is configured to control the locking device 13 of each box 11 or 11*a* in response to an operation on the operation unit 20 by the user. As shown in FIG. 2, the control device 30 includes a CPU 31 and a memory 32. For example, a deposit program 32*a* for performing control when luggage is to be deposited in a box 11 or 11*a* and a take-out program 32*b* for performing control when luggage is to be taken out from a box 11 or 11*a* are stored in the memory 32. The control device 30 is electrically connected to each locking device 13, each lever 14, and the operation unit 20, and is configured to perform control of each locking device 13, screen display of the display unit 22, etc., based on the deposit program 32*a* or the take-out program 32*b*. In FIG. 2, only one locking device 13 is shown for convenience, but in actuality, locking devices 13 whose number is equal to the number of boxes 11 and 11*a* are connected to the control device 30. In addition, a communication unit 50 is connected to the control device 30, and the locker apparatus 1 is capable of communicating with a management apparatus (not shown) via the communication unit 50. The management apparatus is an apparatus that is installed on the premises of a station or any other predetermined location and is higher in rank than the locker apparatus 1.

The control device 30 is configured to automatically open and close the door 12 of each box 11 or 11*a* by controlling the locking device 13. In addition, each locking device 13 of this embodiment normally locks each door 12 into a closed state. When each door 12 is to be opened, the door 12 is opened manually, and when each door 12 is to be closed, the door 12 is closed manually or automatically by a spring or the like.

The locker apparatus 1 of this embodiment is a so-called "normally closed-type locker apparatus", and the control device 30 is configured to lock each locking device 13 in order to lock the door 12 into a closed state except when luggage is deposited in the box 11 or 11*a* or when luggage is taken out from the box 11 or 11*a*.

(Luggage Deposit Procedure)

Next, the procedure for the user to deposit luggage in the locker apparatus 1 will be described.

A state where no luggage is accommodated (state where the user can deposit luggage) in the plurality of boxes 11 and 11*a* is referred to as "standby mode". Each box 11 or 11*a* in the standby mode is in a locked state. At this time, the locking device 13 locks the door 12 of the box 11 or 11*a* into a closed state.

In the standby mode, in order to deposit luggage in the box 11 or 11*a*, the user first performs acceptance of the start of use using the operation unit 20. The control device 30 displays a virtual button for selecting deposit, on the display unit 22, and starts the acceptance by the user tapping the virtual button. Here, the virtual button is an illustration displayed on the display unit 22, and is a button that functions electrically when the user taps the button on the screen.

Then, the control device 30 displays a usage fee on the display unit 22. The user who has confirmed the fee enters use data and settles the fee using the QR code reader 23 and the settlement terminal 24. In the settlement, for example, the unique number of the IC tag of an IC card read by the settlement terminal 24 is stored in the memory 32, and this data is used for authentication when luggage is to be taken out. After the settlement is performed, the control device 30 prints a receipt as a certificate of use using the printer 26. The settlement is not limited to the form using an IC card, and may be another form such as credit card settlement or QR code settlement, or a plurality of forms may be selectively combined. In addition, when settlement is performed by a method other than an IC card, a private code such as a QR code (registered trademark) for unlocking can be printed on a receipt, and authentication can be performed by reading the printed private code.

(Luggage Take-Out Procedure)

Next, the procedure for the user to take out luggage from the locker apparatus 1 will be described.

In order to take out luggage from the locker apparatus 1, the user enters necessary data into the operation unit 20. The control device 30 displays a virtual button for selecting take-out, on the display unit 22, and starts the acceptance by the user tapping the virtual button. At this time, if the daily usage fee for the locker apparatus 1 is exceeded, for example, if the locker apparatus 1 has been used over two days, the excess fee is deducted by credit card settlement, cashless settlement, or the like to complete payment. After the payment is completed, the control device 30 unlocks the locking device 13 to open the door 12 of the box 11 or 11*a*. The user takes out the luggage from the box 11 or 11*a* and closes the door 12. At this time, the control device 30 locks the locking device 13 to lock the door 12 of the box 11 or 11*a* into a closed state.

(Technical Features of Locker Apparatus of this Embodiment)

In order to solve the problems of the conventional normally closed-type locker apparatuses described above, the normally closed-type locker apparatus 1 of this embodiment is configured to allow a "reopening door mode" for opening a door 12 again to be executed in order to permit an operation for taking out luggage or the like unintentionally left in a box 11 or 11*a*, redepositing luggage in a box 11 or 11*a*, or the like, immediately after luggage is deposited, without any fee.

(Operation of Reopening Door Mode)

In this embodiment, the control device 30 is configured to sequentially transition the screen of the display unit 22 from a predetermined "standby screen" in response to an operation on a virtual button by the user. FIG. 3 to FIG. 11 each show a transition screen displayed on the display unit 22 when the "reopening door mode" is executed. The control device 30 controls interactive screen transitions on the display unit 22 related to the "reopening door mode" based on the preset deposit program 32*a*.

Figure 3:
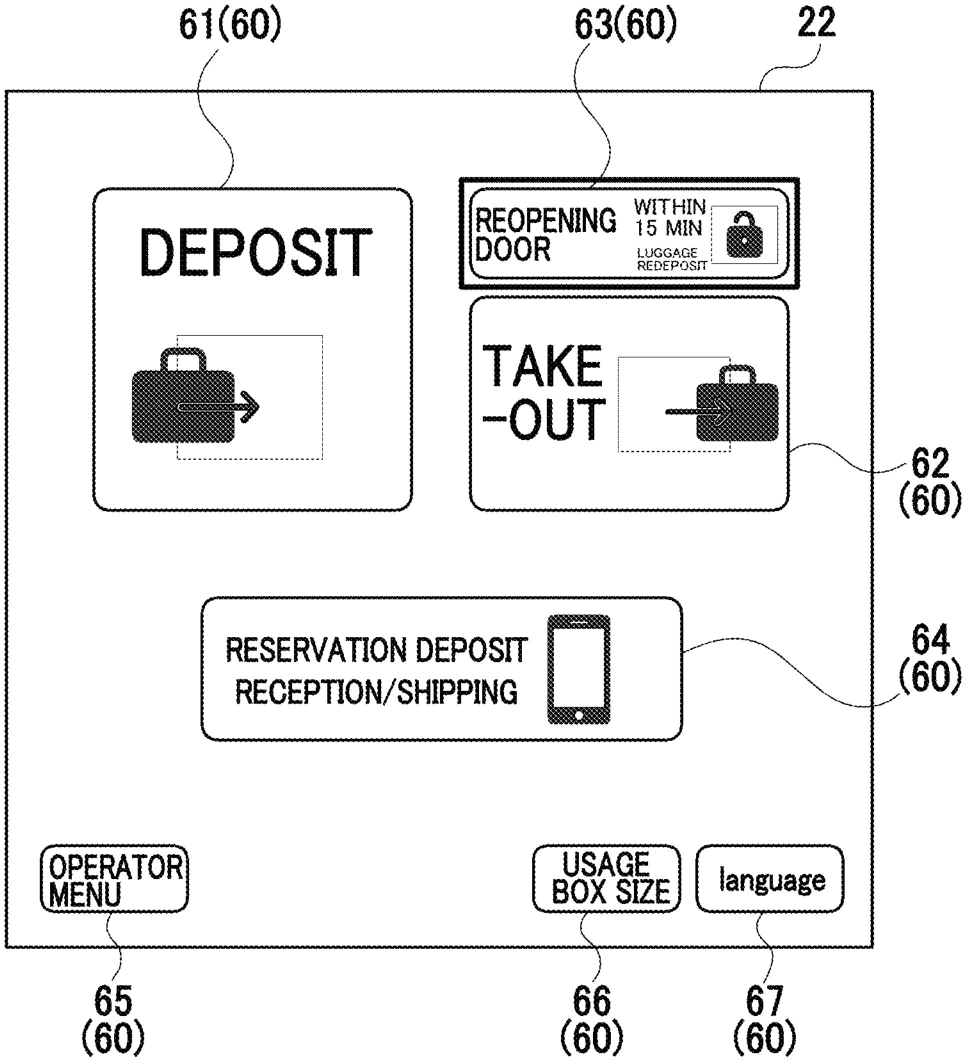
FIG. 3 shows a standby screen displayed on a display unit when a reopening door mode is executed, according to the first embodiment.

First, when the user faces the display unit 22 of the operation unit 20, the control device 30 displays a "standby screen" shown in FIG. 3 on the display unit 22. A plurality of virtual buttons 60 that can be tapped are displayed on the standby screen. A deposit button 61 that is operated by the user when the user deposits luggage in a box 11 or 11*a*, a take-out button 62 that is operated by the user when the user takes out luggage from a box 11 or 11*a*, and a reopening door button 63 that can be operated by the user to give an instruction to reopen a door 12 are displayed in the upper part of the standby screen. The reopening door button 63 is a button that is operated by the user particularly when the user redeposits luggage in a box 11 or 11*a*, not when the user takes out luggage from a box 11 or 11*a*. On the standby screen, the deposit button 61 and the take-out button 62 are displayed side by side, and the reopening door button 63 is placed adjacent to the upper side of the take-out button 62. The width of the reopening door button 63 is substantially equal to that of the take-out button 62, and the height of the reopening door button 63 is smaller than that of the take-out button 62. This size setting is made such that the take-out button 62 for take-out of luggage which occurs more frequently than redeposit of luggage is made more conspicuous than the reopening door button 63 to eliminate mistakes in button operation. In addition, a reservation deposit button 64 for instructing reservation deposit, reception, and shipping of luggage is displayed in the middle part of the standby screen. Furthermore, an operator menu button 65 for selecting a luggage handling business operator, a usage button 66 for instructing explanation of the usage and designating a box size, and a language button 67 for selecting a display language are displayed in the lower part of the standby screen.

On the standby screen, the user taps the reopening door button 63 in order to execute the reopening door mode. In this embodiment, a door 12 can be opened again without any fee within a predetermined time immediately after luggage is deposited. In this embodiment, "within 15 minutes" is set as within the predetermined time. In addition, in this embodiment, each door 12 is set such that the door 12 can be opened multiple times "within 15 minutes".

Figure 4:
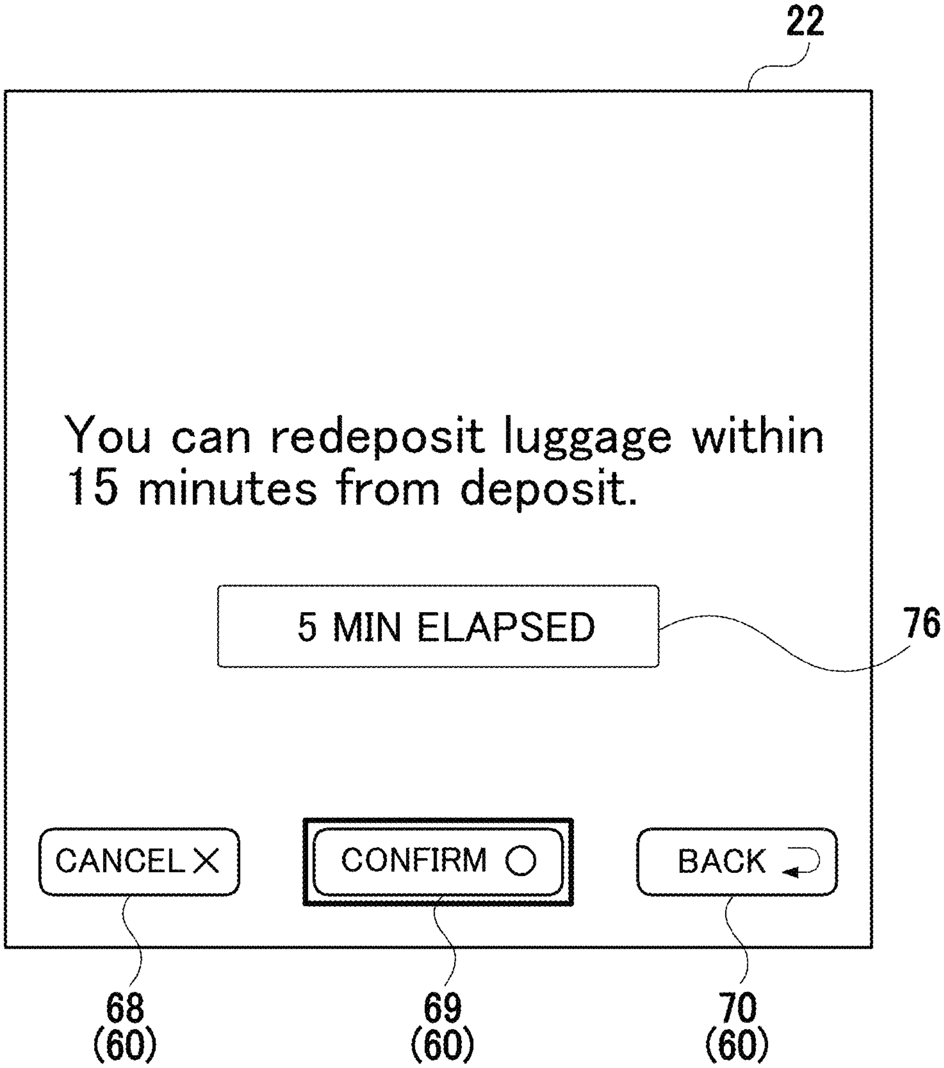
FIG. 4 shows a confirmation screen displayed on the display unit when the reopening door mode is executed, according to the first embodiment.

If the reopening door button 63 is tapped, the control device 30 causes the display of the display unit 22 to transition from the standby screen to a "confirmation screen" shown in FIG. 4. On the confirmation screen, a text or the like, and a plurality of virtual buttons 60 that can be tapped are displayed. An explanation text "You can redeposit luggage within 15 minutes from deposit", and a small display 76 indicating the elapsed time from the deposit are displayed in the middle part of the confirmation screen. In addition, a cancellation button 68 for cancelling an operation, a confirmation button 69 for confirming an operation, and a back button 70 for returning to an immediately previous operation are displayed in the lower part of the confirmation screen.

On the confirmation screen, the user taps the confirmation button 69 in order to confirm the "reopening door mode".

Figure 5:
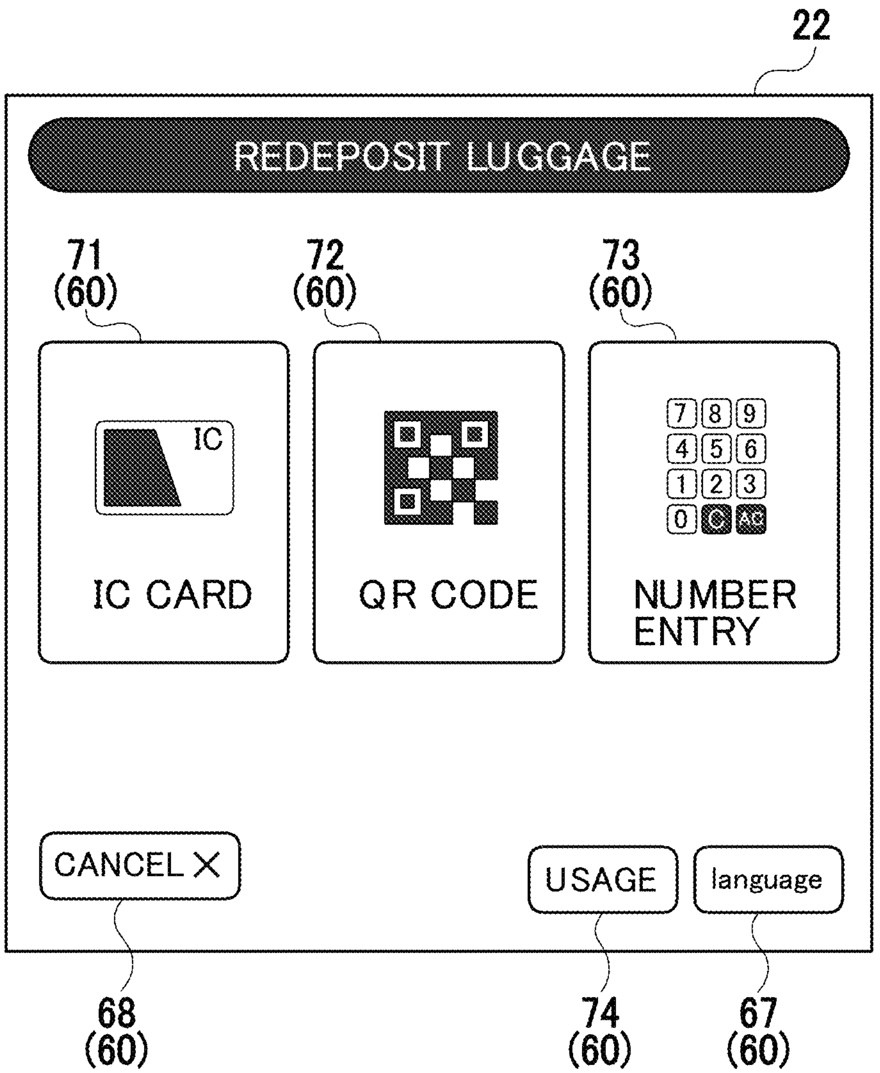
FIG. 5 shows an authentication selection screen displayed on the display unit when the reopening door mode is executed, according to the first embodiment.

If the confirmation button 69 is tapped, the control device 30 causes the display of the display unit 22 to transition to an "authentication selection screen" shown in FIG. 5. On the authentication selection screen, a text or the like, and a plurality of virtual buttons 60 that can be tapped are displayed in order to select an authentication method. A text "Redeposit luggage" is displayed in the upper part of the authentication selection screen. In addition, a plurality of types of authentication buttons for selecting one of a plurality of authentication methods are displayed in the middle part of the authentication selection screen. That is, as the authentication buttons, an IC card button 71 for selecting the use of an IC card, a QR code button 72 for selecting the use of a QR code (registered trademark), and a number entry button 73 for selecting number entry are displayed in the middle part of the authentication selection screen. In addition, a cancellation button 68, a usage button 74 for instructing explanation of the usage, and a language button 67 are displayed in the lower part of the authentication selection screen.

A payment method in depositing luggage differs depending on the user, and thus the user taps a suitable one from among the various buttons 71 to 73.

Figure 6:
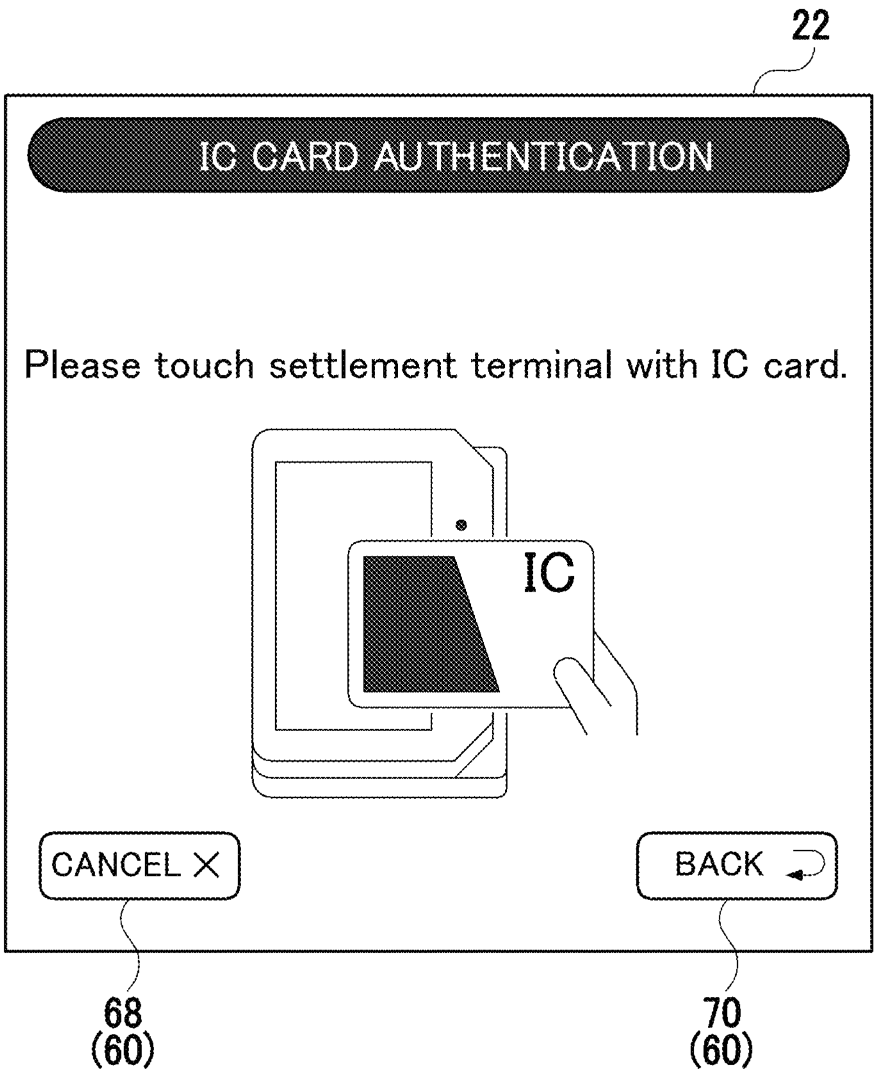
FIG. 6 shows an authentication execution screen displayed on the display unit when the reopening door mode is executed, according to the first embodiment.

Here, if the IC card button 71 is tapped, the control device 30 causes the display of the display unit 22 to transition from the authentication selection screen to an "authentication execution screen" shown in FIG. 6. On the authentication execution screen, a text or the like, an illustration, and virtual buttons 60 that can be tapped are displayed. A text "IC card authentication" is displayed in the upper part of the authentication execution screen. In addition, an illustration prompting an operation on the authentication means corresponding to a selected one authentication method, and an explanation text therefor are displayed in the middle part of the authentication execution screen. That is, an explanation text "Please touch settlement terminal with IC card", and an illustration representing this are displayed in the middle part of the authentication execution screen. In addition, a cancellation button 68 and a back button 70 are displayed in the lower part of the authentication execution screen.

Figure 7:
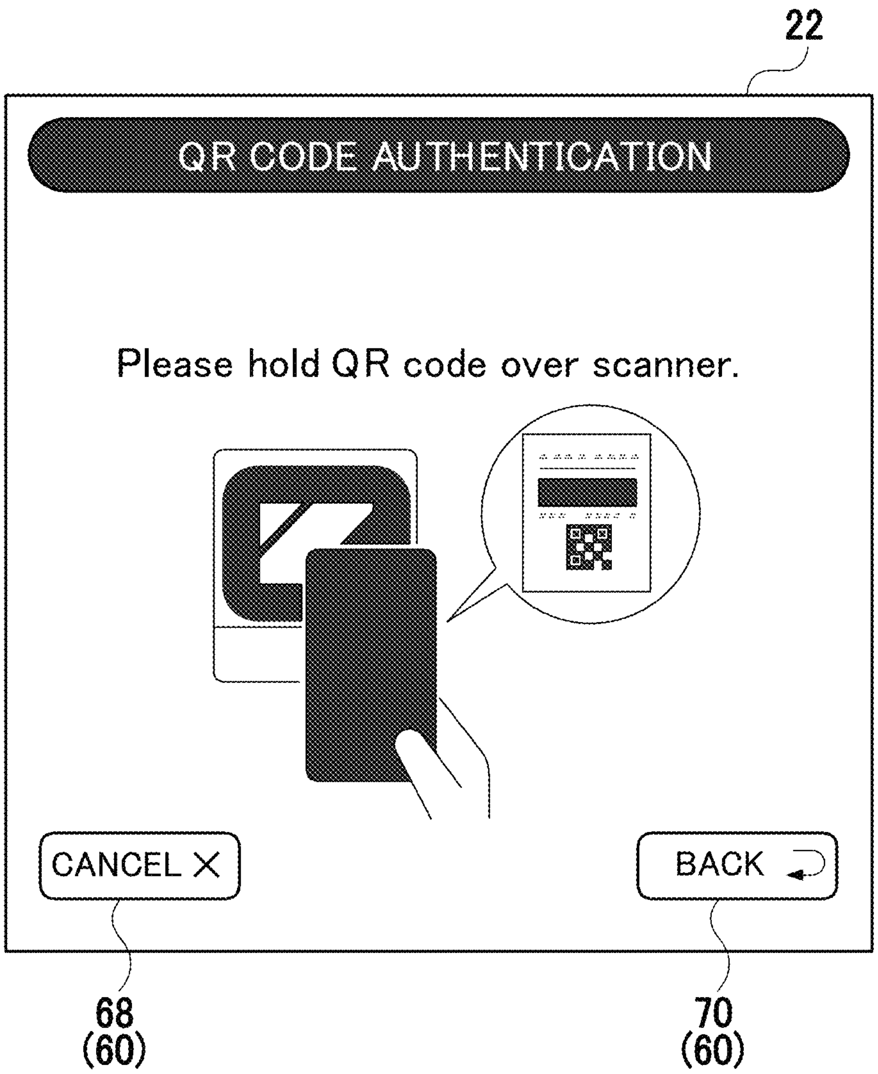
FIG. 7 shows an authentication execution screen displayed on the display unit when the reopening door mode is executed, according to the first embodiment.

Meanwhile, if the QR code button 72 is tapped, the control device 30 causes the display of the display unit 22 to transition to an "authentication execution screen" shown in FIG. 7. On the authentication execution screen, a text or the like, an illustration, and virtual buttons 60 that can be tapped are displayed. A text "QR code authentication" is displayed in the upper part of the authentication execution screen. In addition, an explanation text "Please hold QR code over scanner", and an illustration representing this are displayed in the middle part of the authentication execution screen. In addition, a cancellation button 68 and a back button 70 are displayed in the lower part of the authentication execution screen.

Figure 8:
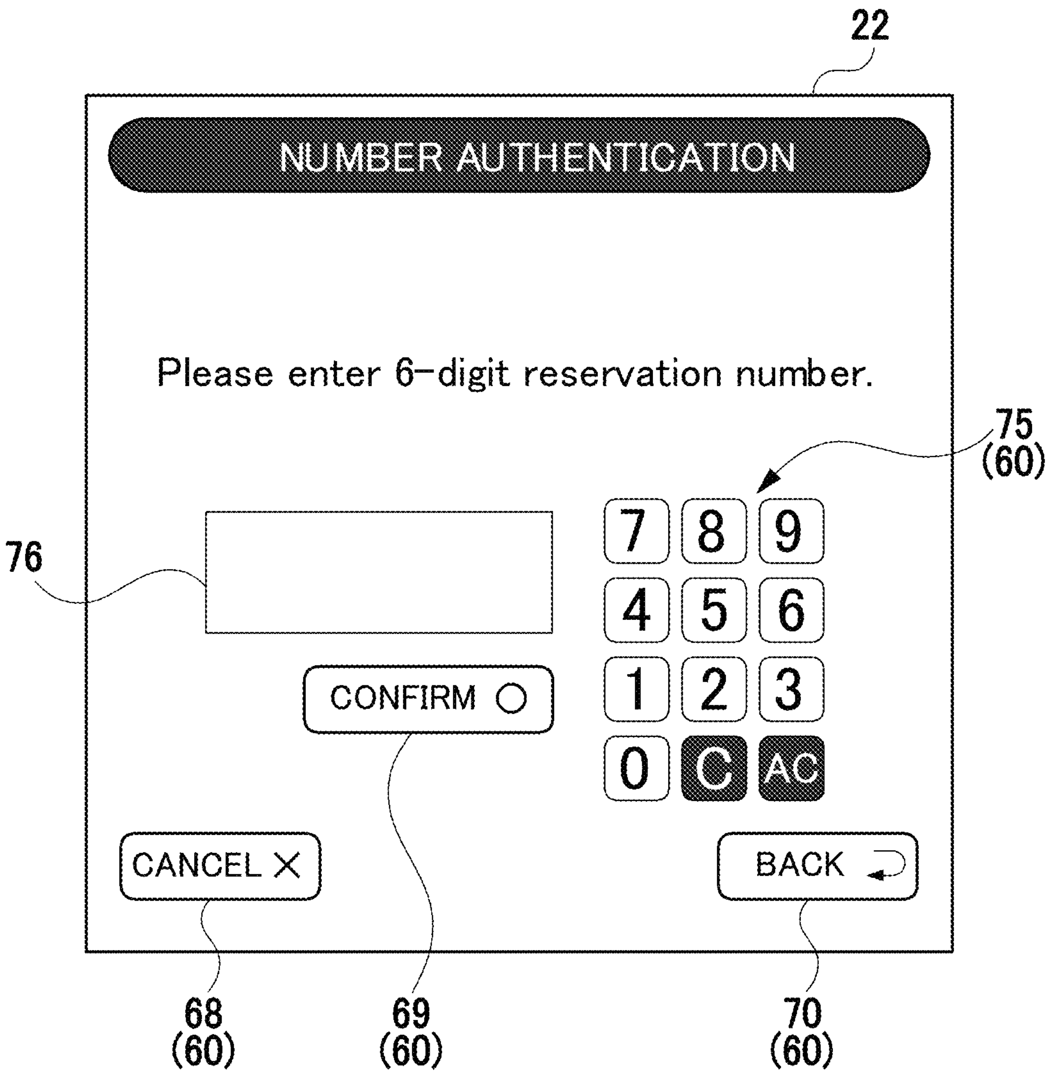
FIG. 8 shows an authentication execution screen displayed on the display unit when the reopening door mode is executed, according to the first embodiment.

If the number entry button 73 is tapped, the control device 30 causes the display of the display unit 22 to transition to an "authentication execution screen" shown in FIG. 8. On the authentication execution screen, a text or the like, an illustration, and virtual buttons 60 that can be tapped are displayed. A text "Number authentication" is displayed in the upper part of the authentication execution screen. In addition, an explanation text "Please enter 6-digit reservation number", a ten-key button 75 as authentication means for entering a number, a small display 76 for displaying the entered number, and a confirmation button 69 are displayed in the middle part of the authentication execution screen. In addition, a cancellation button 68 and a back button 70 are displayed in the lower part of the authentication execution screen.

The user performs authentication in accordance with the authentication method corresponding to one selected screen out of the three authentication execution screens described above.

Here, it is assumed that the user performs "IC card authentication" in accordance with the authentication execution screen shown in FIG. 6, for example. In this case, the control device 30 causes the display of the display unit 22 to transition from the authentication execution screen to a "box selection screen" shown in FIG. 9. On the box selection screen, a text or the like, an illustration, and virtual buttons 60 that can be tapped are displayed. An explanation text "Please select box in which luggage is to be redeposited", and an illustration of a locker apparatus are displayed in the upper part of the box selection screen. In the illustration of the locker apparatus, the numbers corresponding to the boxes 11 and 11*a* in each of which the user has deposited luggage, and selection buttons 80 that can be selected to select these numbers are displayed. In this illustration, boxes with numbers corresponding to the respective boxes 11 and 11*a* are the selection buttons 80. In addition, a cancellation button 68 and a back button 70 are displayed in the lower part of the box selection screen.

If there are a plurality of target boxes, the corresponding boxes are displayed in color (e.g., green) in the illustration of the locker apparatus on the box selection screen. For example, in FIG. 9, if there are two target boxes (boxes with "0028" and "0029"), these two boxes are displayed in color in the illustration of the locker apparatus (shown with diagonal lines in FIG. 9). The user selects a box to be unlocked from the two boxes by tapping. If there is only one target box, the control device 30 skips the display of this box selection screen and causes the display to transition to a "box selection screen" shown in FIG. 10.

Figure 9:
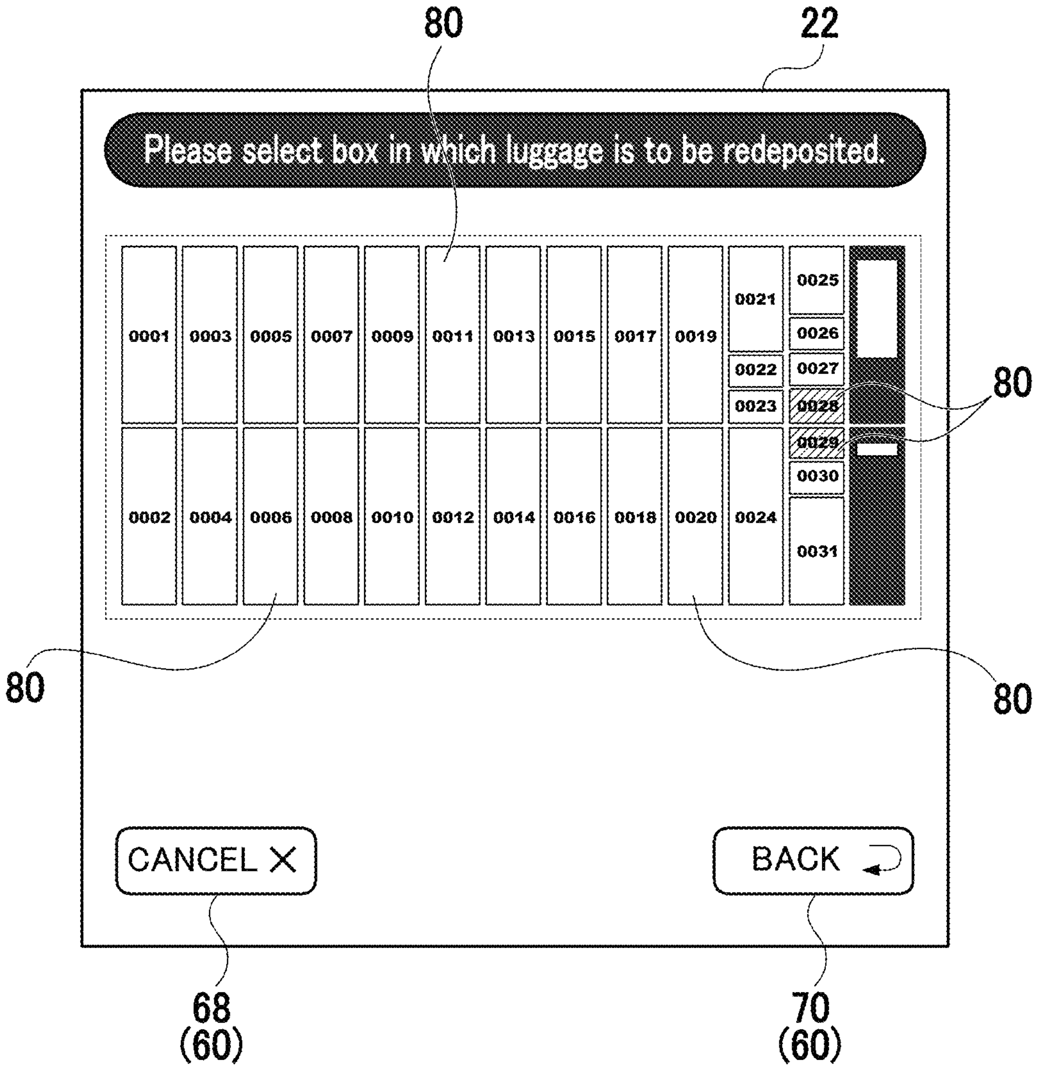
FIG. 9 shows a box selection screen displayed on the display unit when the reopening door mode is executed, according to the first embodiment.
Figure 10:
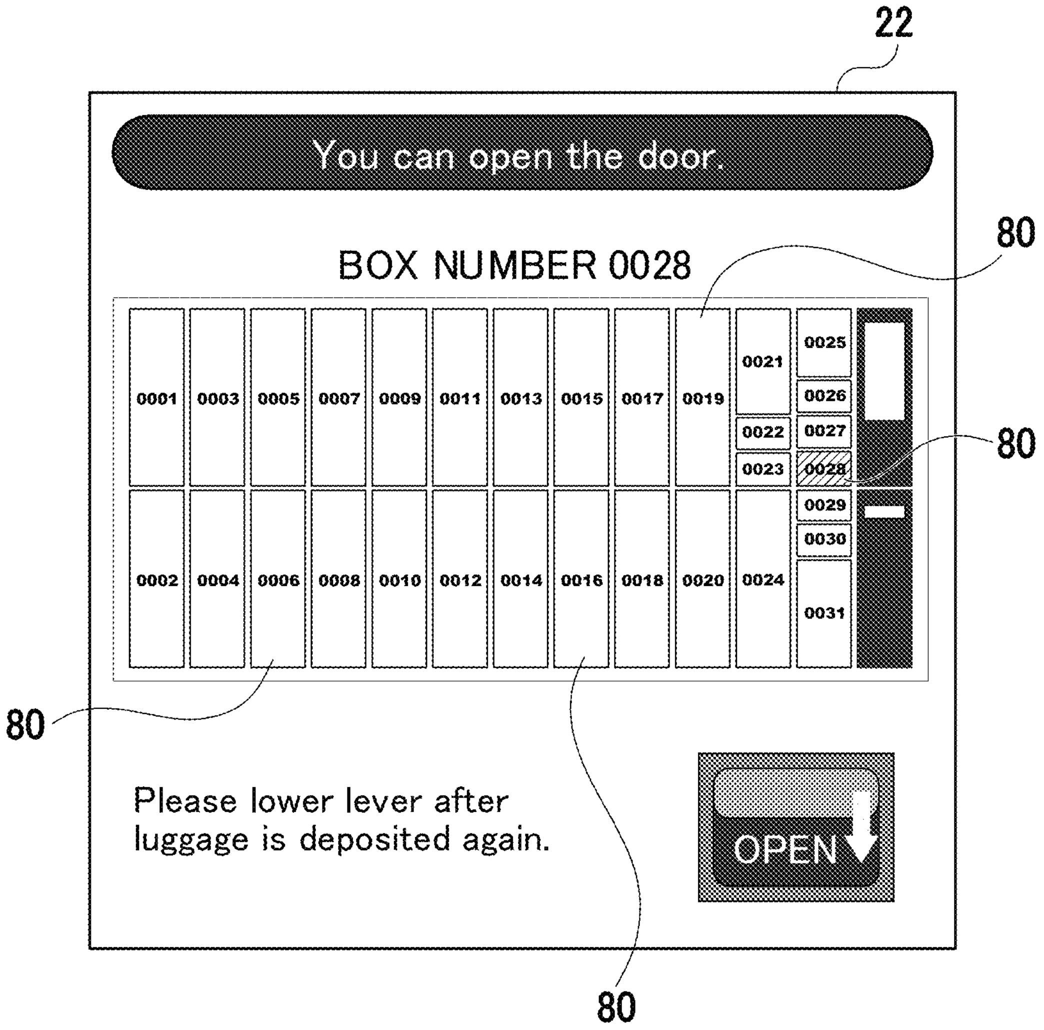
FIG. 10 shows a box selection screen displayed on the display unit when the reopening door mode is executed, according to the first embodiment.

On the box selection screen in FIG. 10, a text or the like, an illustration, and virtual buttons 60 that can be tapped are displayed. An explanation text "You can open the door" is displayed in the upper part of the box selection screen, and a text "Box number 0028" indicating the target box, and an illustration of a locker apparatus corresponding to FIG. 9 are displayed in the middle part of the same screen. In this case, the target box with "0028" is displayed in color (e.g., green) in the illustration of the locker apparatus (shown with diagonal lines in FIG. 10). In addition, an explanation text prompting an operation on the lever 14 after luggage is deposited again, and an illustration for the operation on the lever 14 are displayed in the lower part of the box selection screen. That is, an explanation text "Please lower lever after luggage is deposited again", and an illustration for the operation on the lever 14 are displayed in the lower part of the box selection screen.

When this box selection screen is displayed, the locking device 13 of the target box 11 or 11*a* in the actual locker apparatus 1 is unlocked. The user opens the door 12 of this box 11 or 11*a*, takes out unintentionally left luggage or the like from the box 11 or 11*a* or deposits luggage again, then closes the door 12, and lowers the lever 14 to the closed side.

Figure 11:
FIG. 11 shows an end screen displayed on the display unit when the reopening door mode is executed, according to the first embodiment.

When the lever 14 is lowered to the closed side, the control device 30 displays an "end screen" shown in FIG. 11 on the display unit 22. An explanation text "Thank you for using our service" is displayed in the middle part of the end screen. Then, the control device 30 returns the display of the display unit 22 to the standby screen shown in FIG. 3.

The above is a series of descriptions regarding the transition screens when the user correctly selects and taps the reopening door button 63 in order to execute the reopening door mode.

In contrast, if the user intends to execute the reopening door mode but taps the take-out button 62 by mistake instead of the reopening door button 63 on the standby screen shown in FIG. 3, the screen of the display unit 22 transitions as follows. FIG. 12 to FIG. 24 each show a transition screen of the display unit 22 in this case.

Figure 12:
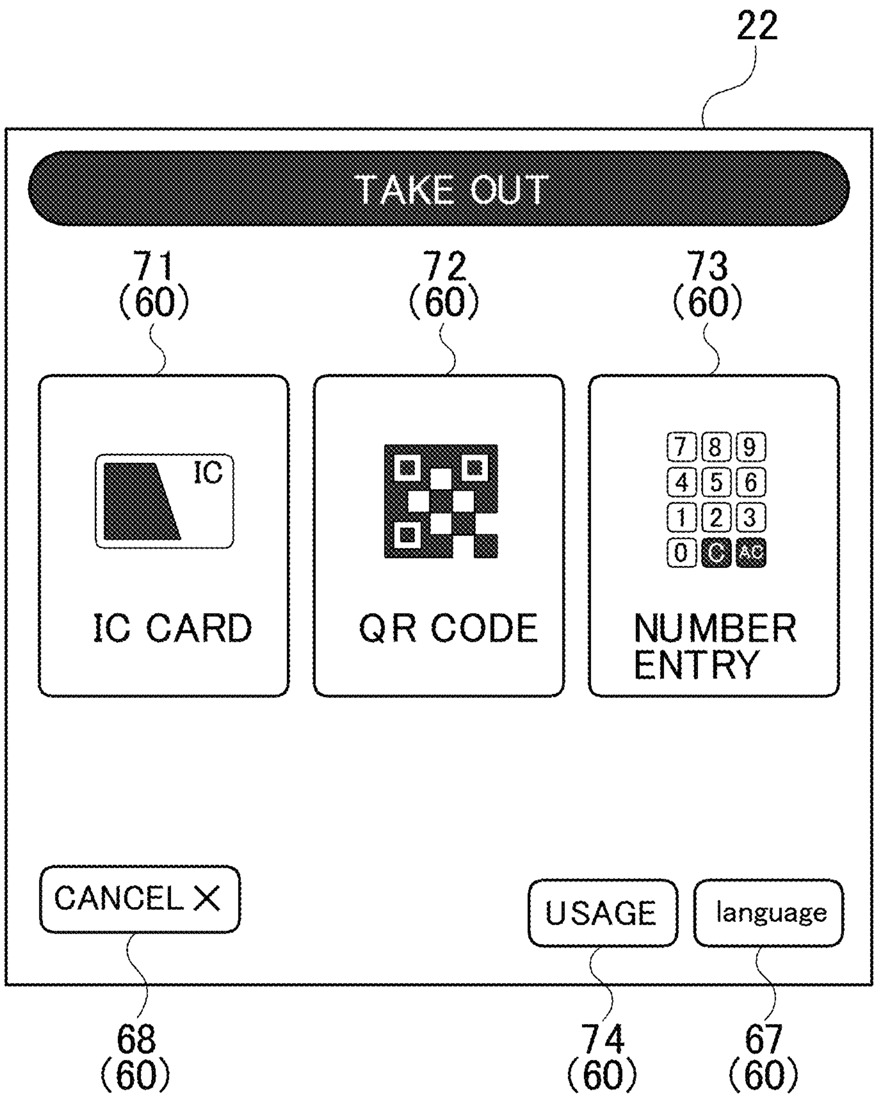
FIG. 12 shows an authentication selection screen displayed on the display unit when a user taps a take-out button by mistake instead of a reopening door button, according to the first embodiment.

In other words, the control device 30 causes the display of the display unit 22 to transition to an "authentication selection screen" shown in FIG. 12. On the authentication selection screen, a text or the like, and a plurality of virtual buttons 60 that can be tapped are displayed in order to select an authentication method. A text "Take out" is displayed in the upper part of the authentication selection screen. In addition, a plurality of types of authentication buttons for selecting one of the plurality of authentication methods are displayed in the middle part of the authentication selection screen. That is, as the authentication buttons, an IC card button 71 for selecting the use of an IC card, a QR code button 72 for selecting the use of a QR code (registered trademark), and a number entry button 73 for selecting number entry are displayed in the middle part of the authentication selection screen. In addition, a cancellation button 68 for cancelling an operation, a usage button 74 for instructing explanation of the usage, and a language button 67 are displayed in the lower part of the authentication selection screen.

A payment method in depositing luggage differs depending on the user, and thus the user taps a suitable one from among the various buttons 71 to 73.

Figure 13:
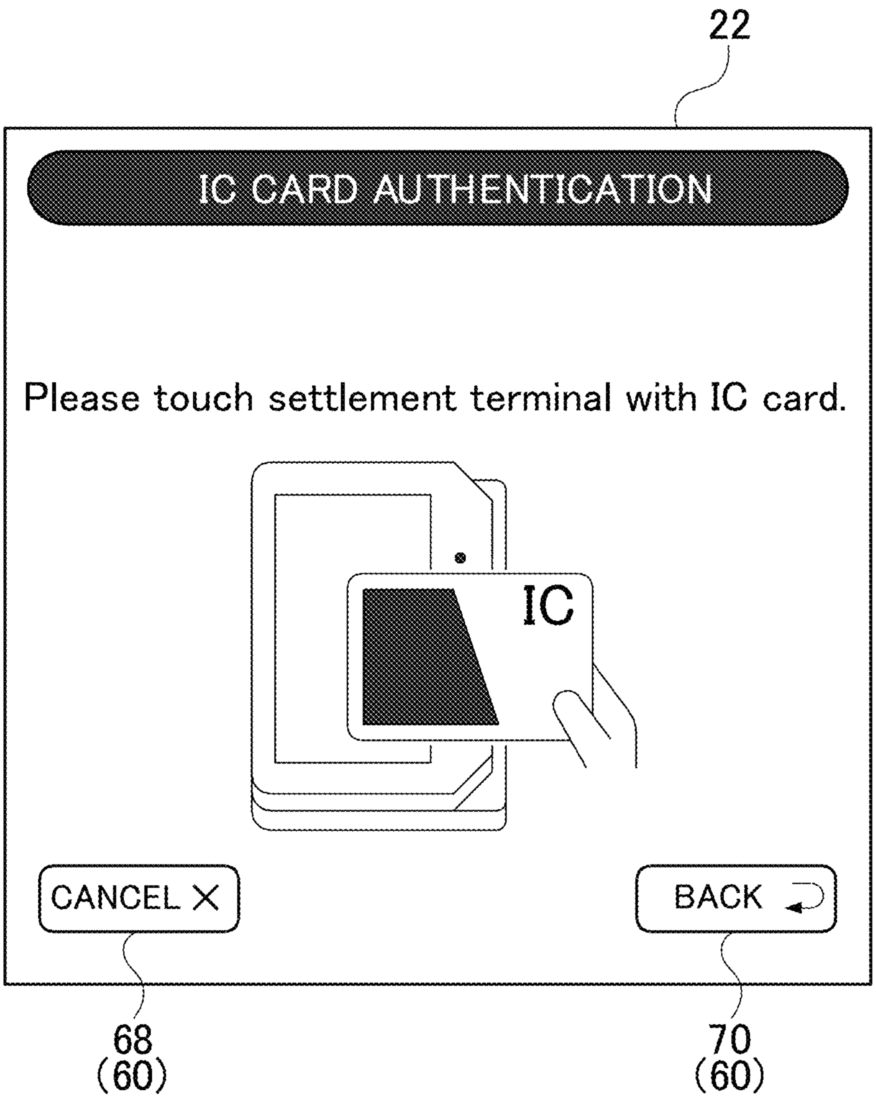
FIG. 13 shows an authentication execution screen displayed on the display unit when the user taps the take-out button by mistake instead of the reopening door button, according to the first embodiment.

Here, if the IC card button 71 is tapped, the control device 30 causes the display of the display unit 22 to transition from the authentication selection screen to an "authentication execution screen" shown in FIG. 13. On the authentication execution screen, a text or the like, an illustration, and virtual buttons 60 that can be tapped are displayed. A text "IC card authentication" is displayed in the upper part of the authentication execution screen. In addition, an illustration prompting an operation on the authentication means corresponding to a selected one authentication method, and an explanation text therefor are displayed in the middle part of the authentication execution screen. That is, an explanation text "Please touch settlement terminal with IC card", and an illustration representing this are displayed in the middle part of the authentication execution screen. In addition, a cancellation button 68 and a back button 70 are displayed in the lower part of the authentication execution screen.

Figure 14:
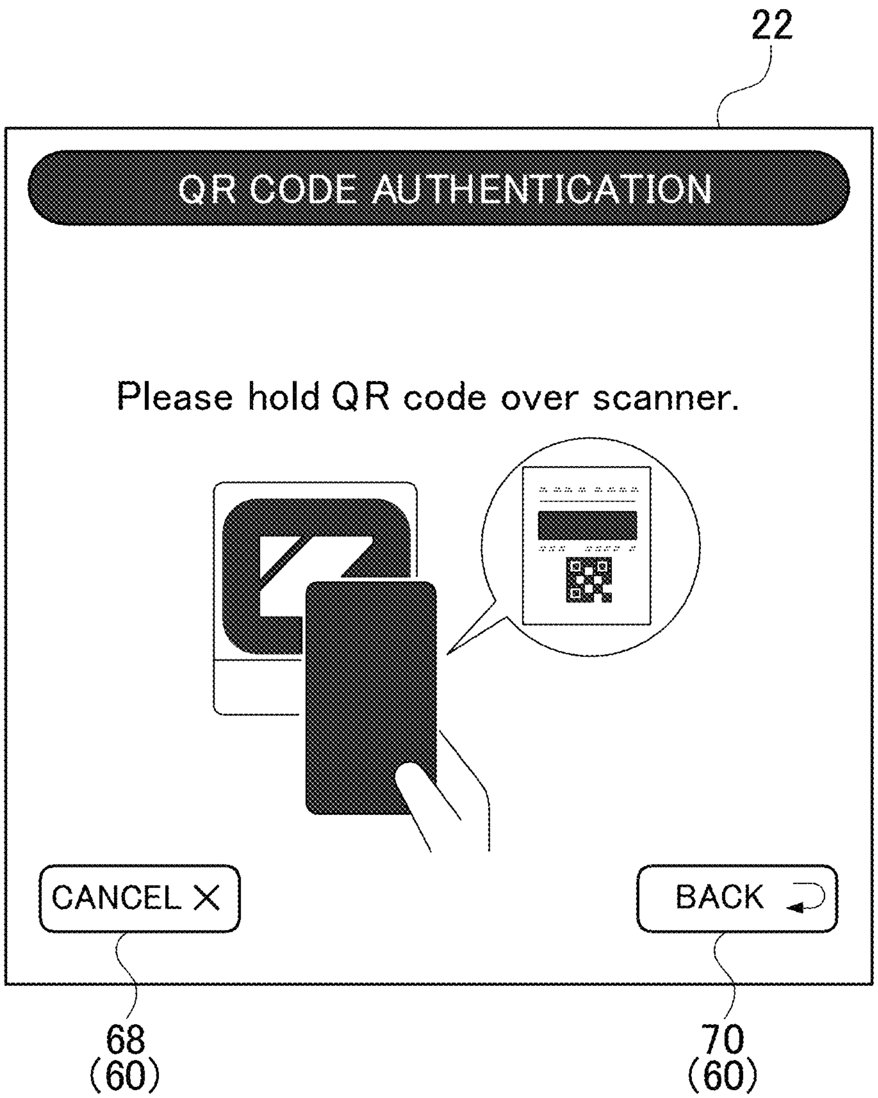
FIG. 14 shows an authentication execution screen displayed on the display unit when the user taps the take-out button by mistake instead of the reopening door button, according to the first embodiment.

Meanwhile, if the QR code button 72 is tapped, the control device 30 causes the display of the display unit 22 to transition to an "authentication execution screen" shown in FIG. 14. On the authentication execution screen, a text or the like, an illustration, and virtual buttons 60 that can be tapped are displayed. A text "QR code authentication" is displayed in the upper part of the authentication execution screen. In addition, an explanation text "Please hold QR code over scanner", and an illustration representing this are displayed in the middle part of the authentication execution screen. In addition, a cancellation button 68 and a back button 70 are displayed in the lower part of the authentication execution screen.

Figure 15:
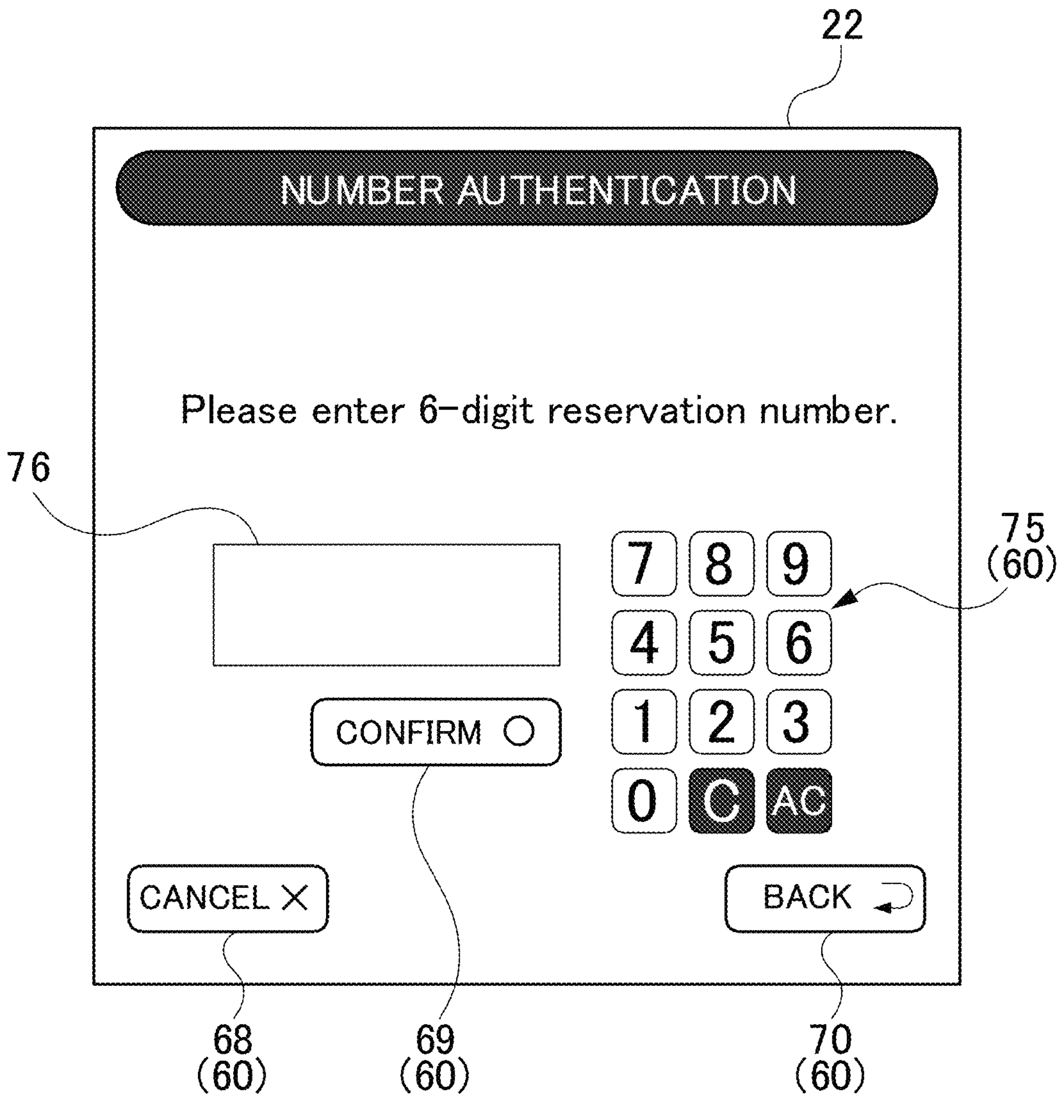
FIG. 15 shows an authentication execution screen displayed on the display unit when the user taps the take-out button by mistake instead of the reopening door button, according to the first embodiment.

If the number entry button 73 is tapped, the control device 30 causes the display of the display unit 22 to transition to an "authentication execution screen" shown in FIG. 15. On the authentication execution screen, a text or the like, an illustration, and virtual buttons 60 that can be tapped are displayed. A text "Number authentication" is displayed in the upper part of the authentication execution screen. In addition, an explanation text "Please enter 6-digit reservation number", a ten-key button 75 as authentication means for entering a number, a small display 76 for displaying the entered number, and a confirmation button 69 are displayed in the middle part of the authentication execution screen. In addition, a cancellation button 68 and a back button 70 are displayed in the lower part of the authentication execution screen.

The user performs authentication in accordance with the authentication method corresponding to one selected screen out of the three authentication execution screens described above.

Here, it is assumed that the user performs "IC card authentication" in accordance with the authentication execution screen shown in FIG. 13, for example. In this case, the control device 30 causes the display of the display unit 22 to transition from the authentication execution screen to a "box selection screen" shown in FIG. 16. On the box selection screen, a text or the like, an illustration, and virtual buttons 60 that can be tapped are displayed. An explanation text "Please select box from which luggage is to be taken out" is displayed in the upper part of the box selection screen. An illustration of a locker apparatus and an explanation of the coloring in the illustration are displayed in the middle part of the box selection screen. In the illustration of the locker apparatus, the numbers corresponding to the boxes 11 and 11$a$ in each of which the user has deposited luggage, and selection buttons 80 that can be selected to select these numbers are displayed. In this illustration, boxes with numbers corresponding to the respective boxes 11 and 11$a$ are the selection buttons 80. In addition, a cancellation button 68 and a back button 70 are displayed in the lower part of the box selection screen.

If the user performs authentication with an IC card, there may be a plurality of target boxes. In this case, the target boxes are displayed in color (e.g., green or yellow) in the illustration of the locker apparatus on the box selection screen shown in FIG. 16. For example, in FIG. 16, if there are a plurality of target boxes, the corresponding boxes are displayed in color in the illustration of the locker apparatus (shown with diagonal lines or a grid in FIG. 16). The user selects a box to be unlocked from among the colored boxes by tapping. If there is only one target box, the control device 30 skips the display of the box selection screen in FIG. 16.

Figure 16:
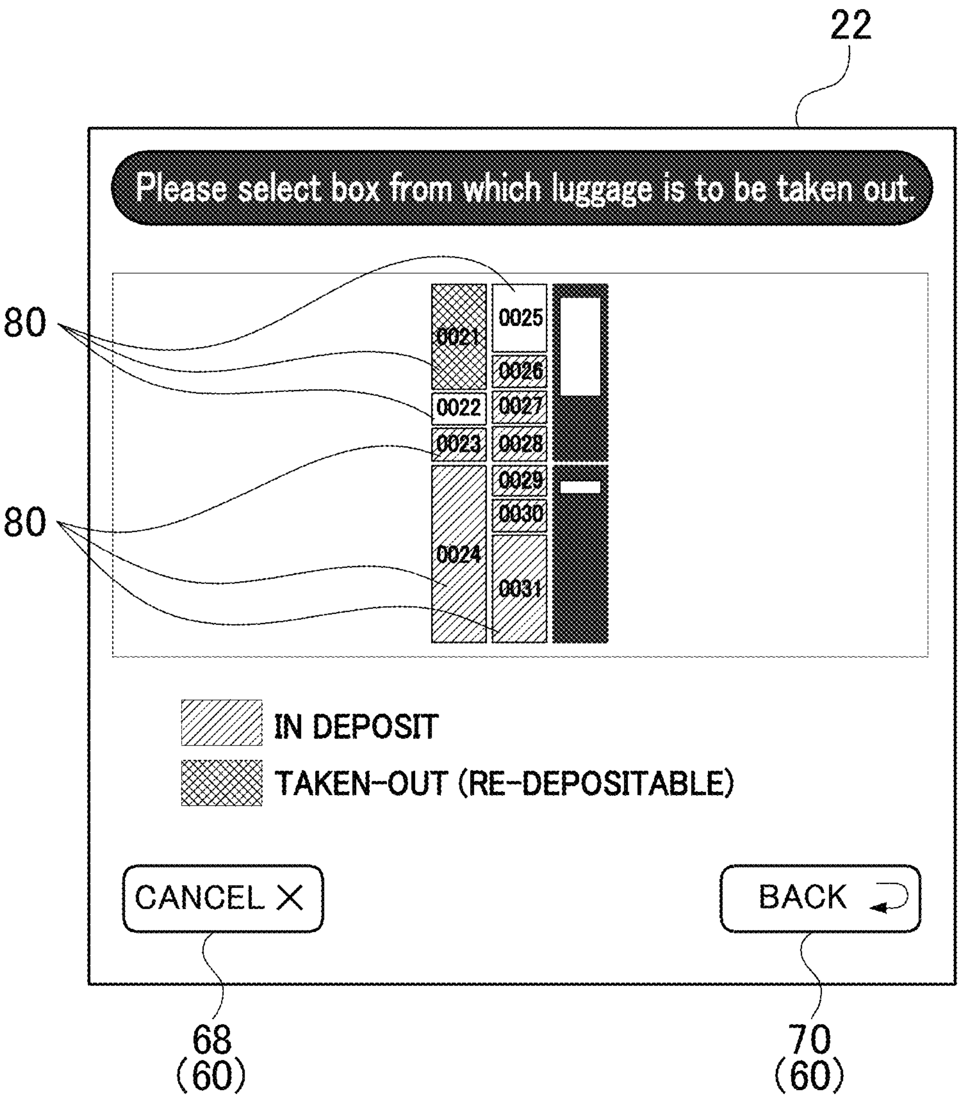
FIG. 16 shows a box selection screen displayed on the display unit when a luggage take-out mode is executed, according to the first embodiment.
Figure 17:
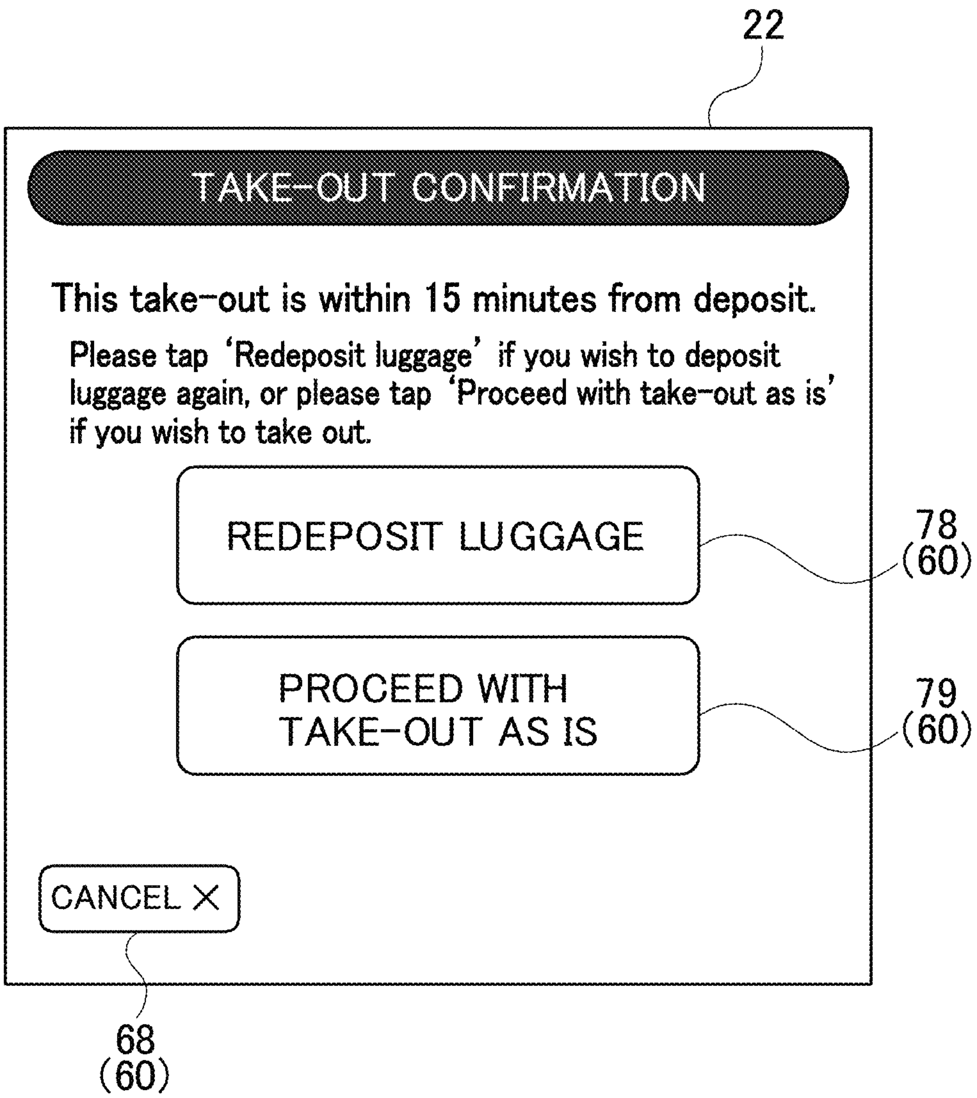
FIG. 17 shows a take-out confirmation screen displayed on the display unit when the user taps the take-out button by mistake instead of the reopening door button, according to the first embodiment.

If the user taps a box to be unlocked from among the colored boxes on the box selection screen in FIG. 16 and this tap is "within 15 minutes" from deposit of luggage, the control device 30 causes the display of the display unit 22 to transition to a "take-out confirmation screen" shown in FIG. 17. On the take-out confirmation screen, a text or the like, and a plurality of virtual buttons 60 that can be tapped are displayed. A text "Take-out confirmation" and an explanation text "This take-out is within 15 minutes from deposit. Please tap 'Redeposit luggage' if you wish to deposit luggage again, or please tap 'Proceed with take-out as is' if you wish to take out" are displayed in the upper part of the take-out confirmation screen. In addition, a luggage redeposit button 78 for instructing redeposit of luggage and a take-out button 79 for instructing take-out of luggage as is are displayed in the middle part of the take-out confirmation screen. Furthermore, a cancellation button 68 is displayed in the lower part of the take-out confirmation screen. In this embodiment, this take-out confirmation screen is provided on the assumption that the user may intend to redeposit luggage but tap the take-out button 62 by mistake instead of the reopening door button 63.

Figure 18:
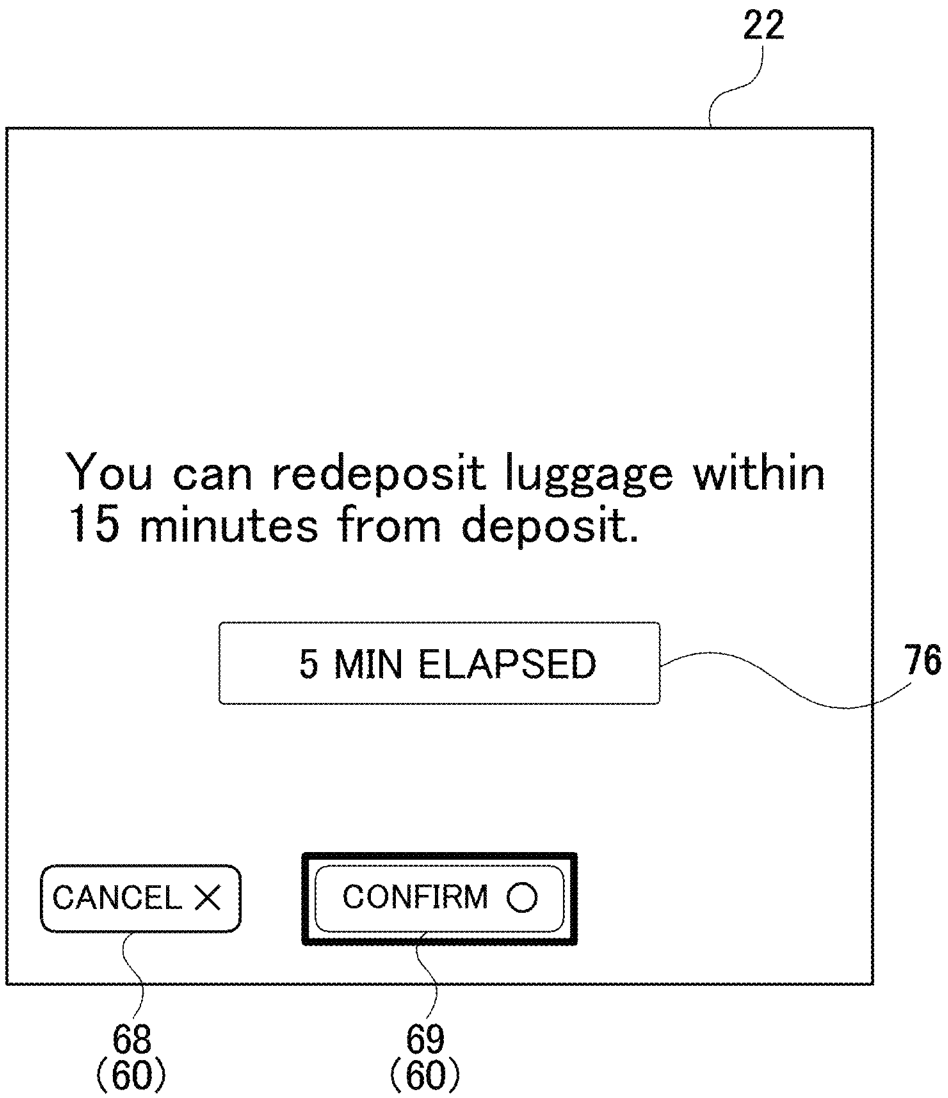
FIG. 18 shows a redeposit confirmation screen displayed on the display unit when the user taps the take-out button by mistake instead of the reopening door button, according to the first embodiment.
Figure 21:
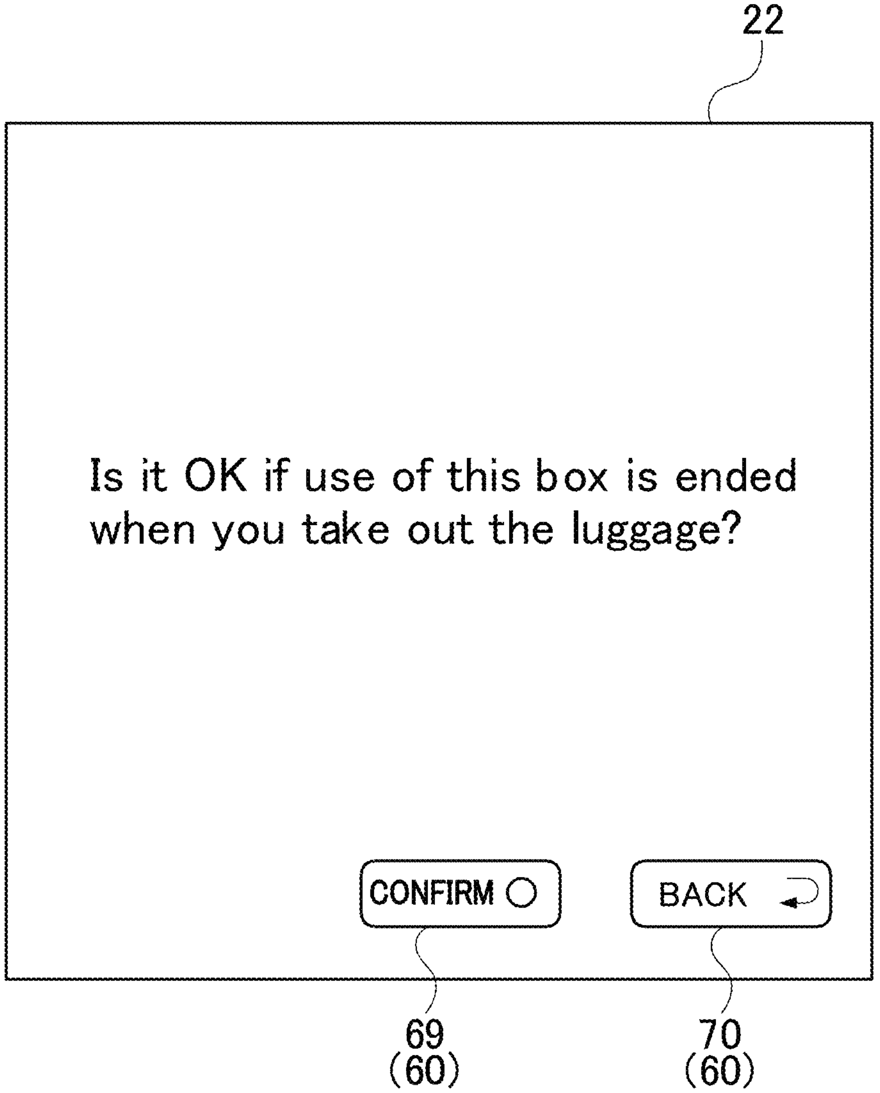
FIG. 21 shows a first warning screen displayed on the display unit when the user taps the take-out button by mistake instead of the reopening door button, according to the first embodiment.

If the user selectively taps either one of the buttons 78 and 79 on the take-out confirmation screen, the control device 30 causes the display of the display unit 22 to transition to a "redeposit confirmation screen" shown in FIG. 18 or a "first warning screen" shown in FIG. 21. However, even if take-out of luggage is "within 15 minutes", if the luggage is to be taken out again, the redeposit confirmation screen and the box unlocking screen are not displayed.

If the user taps the luggage redeposit button 78 on the take-out confirmation screen, the control device 30 causes the display of the display unit 22 to transition to the "redeposit confirmation screen" shown in FIG. 18. On the redeposit confirmation screen, a text or the like, and a plurality of virtual buttons 60 that can be tapped are displayed. An explanation text "You can redeposit luggage within 15 minutes after deposit", and a small display 76 indicating the elapsed time from the deposit are displayed in the middle part of the redeposit confirmation screen. In addition, a cancellation button 68 and a confirmation button 69 are displayed in the lower part of the redeposit confirmation screen.

Figure 19:
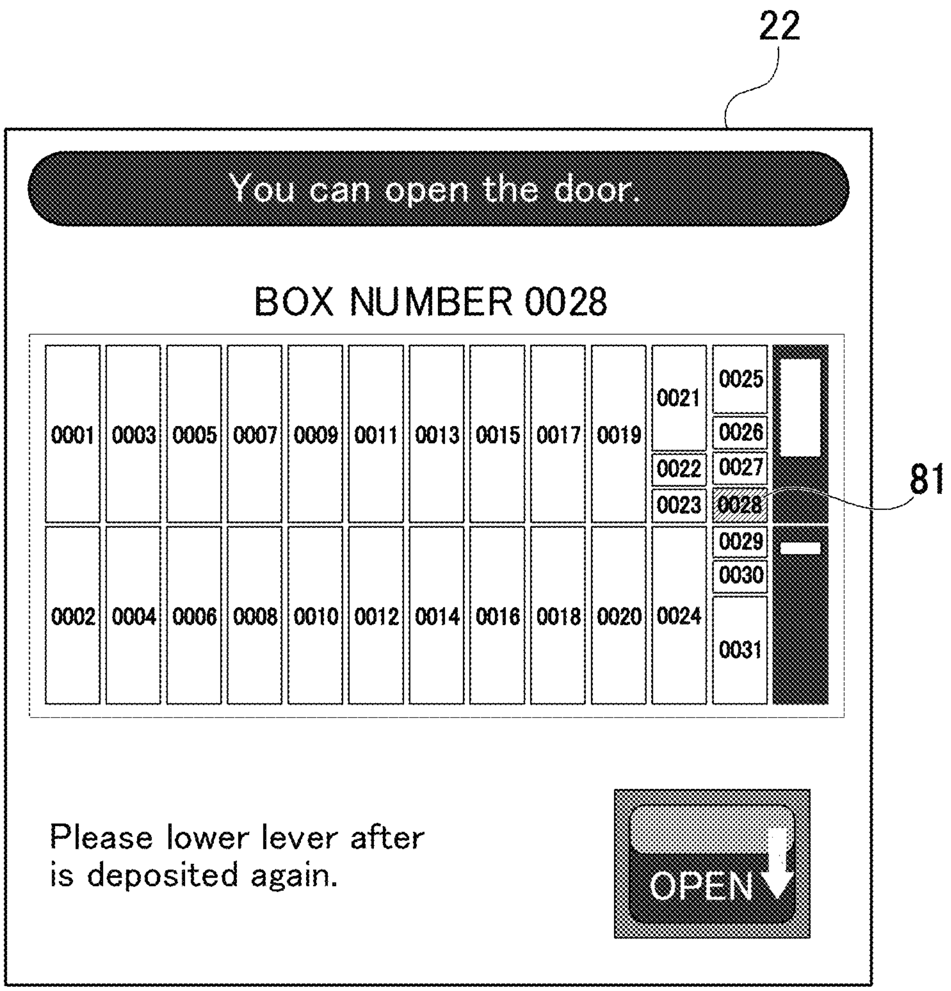
FIG. 19 shows a box unlocking screen displayed on the display unit when the user taps the take-out button by mistake instead of the reopening door button, according to the first embodiment.

If the user taps the confirmation button 69, the control device 30 causes the display of the display unit 22 to transition to a "box unlocking screen" shown in FIG. 19. On the box unlocking screen, a text or the like, an illustration, and virtual buttons 60 that can be tapped are displayed. An explanation text "You can open the door" is displayed in the upper part of the box unlocking screen, and a text "Box number 0028" indicating a target box, and an illustration of a locker apparatus are displayed in the middle part of the same screen. In this case, the target box 81 with "0028" is colored (e.g., in green) and blinked in the illustration of the locker apparatus (shown with diagonal lines in FIG. 19). In addition, an explanation text prompting an operation on the lever 14 after luggage is deposited again, and an illustration for the operation on the lever 14 are displayed in the lower part of the box unlocking screen. That is, an explanation text "Please lower lever after luggage is deposited again", and an illustration for the operation on the lever 14 are displayed in the lower part of the box unlocking screen.

When this box unlocking screen is displayed, the control device 30 unlocks the locking device 13 of the target box 11 or 11$a$ in the actual locker apparatus 1. The user opens the door 12 of this box 11 or 11$a$, takes out luggage from the box 11 or 11$a$, then closes the door 12, and lowers the lever 14 to the closed side.

Figure 20:
FIG. 20 shows an end screen displayed on the display unit when the user taps the take-out button by mistake instead of the reopening door button, according to the first embodiment.

When the lever 14 is lowered to the closed side, the control device 30 causes the display of the display unit 22 to transition to an "end screen" shown in FIG. 20. An explanation text "Thank you for using our service" is displayed in the middle part of the end screen. Then, the control device 30 returns the display of the display unit 22 to the standby screen shown in FIG. 3.

Meanwhile, if the user taps the take-out button 79 on the take-out confirmation screen shown in FIG. 17, the control device 30 causes the display of the display unit 22 to transition to the "first warning screen" shown in FIG. 21. On the first warning screen, a text or the like, and virtual buttons 60 that can be tapped are displayed. An explanation text "Is it OK if use of this box is ended when you take out the luggage?" is displayed in the middle part of the first warning screen. In addition, a confirmation button 69 and a back button 70 are displayed in the lower part of the first warning screen.

Figure 22:
FIG. 22 shows a second warning screen displayed on the display unit when the user taps the take-out button by mistake instead of the reopening door button, according to the first embodiment.

If the user taps the confirmation button 69 on the first warning screen, the control device 30 causes the display of the display unit 22 to transition to a "second warning screen" shown in FIG. 22. On the second warning screen, a text or the like, and virtual buttons 60 that can be tapped are displayed. An explanation text "Warning: If you tap 'Confirm', the luggage will be regarded as being taken out, and we will not be responsible for any loss of luggage. Is it really OK to proceed?" is displayed in the middle part of the second warning screen. In addition, a confirmation button 69 and a back button 70 are displayed in the lower part of the second warning screen.

Figure 23:
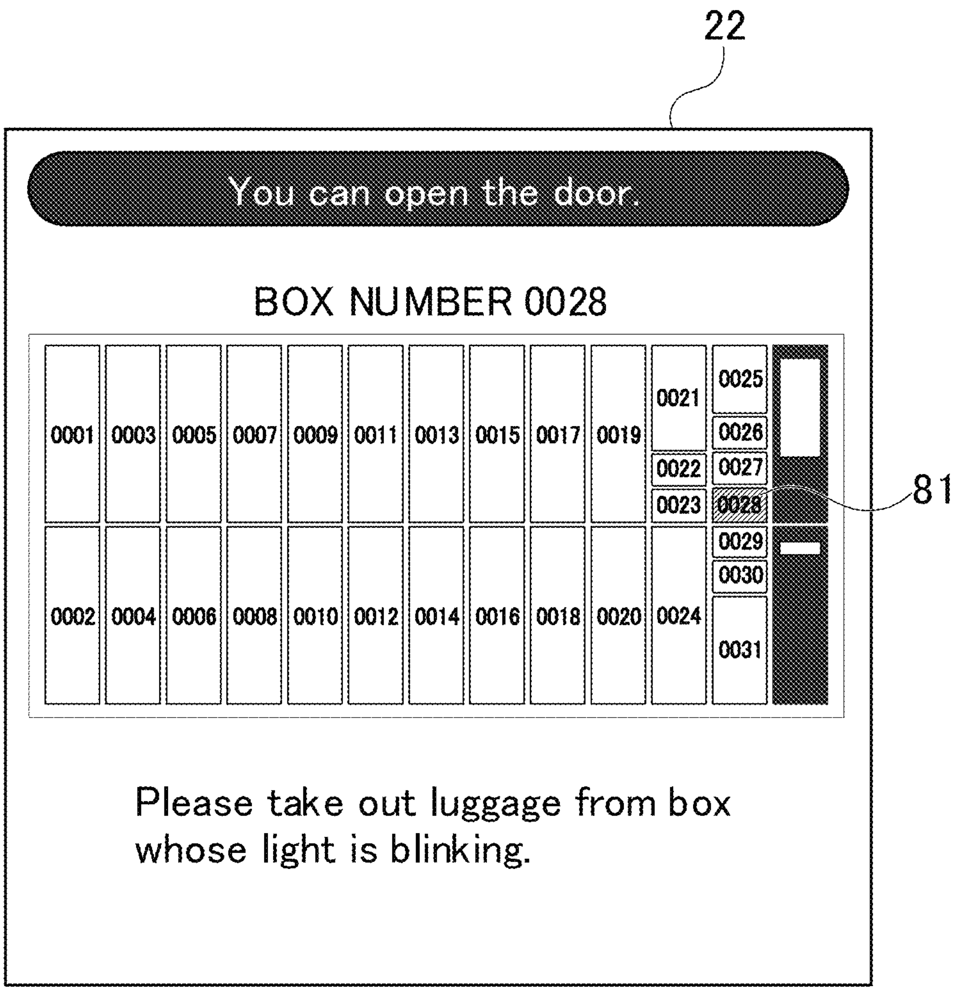
FIG. 23 shows a box unlocking screen displayed on the display unit when the user taps the take-out button by mistake instead of the reopening door button, according to the first embodiment.

If the user taps the confirmation button 69 on the second warning screen shown in FIG. 22, the control device 30 displays a "box unlocking screen" shown in FIG. 23 on the display unit 22. On the box unlocking screen, a text or the like, and an illustration that can be tapped are displayed. An explanation text "You can open the door" is displayed in the upper part of the box unlocking screen. A text "Box number 0028" indicating a target box 81, and an illustration of a locker apparatus are displayed in the middle part of the box unlocking screen. In this case, the target box 81 with "0028" is colored (e.g., in green) and blinked in the illustration of the locker apparatus on the box unlocking screen (shown with diagonal lines in FIG. 23). In addition, an explanation text "Please take out luggage from box whose light is blinking" is displayed in the lower part of the box unlocking screen.

The box 81 blinking in the illustration of the locker apparatus displayed on the box unlocking screen shown in FIG. 23 operates to indicate whether or not there is luggage in the actual box 11 or 11*a*. When this box unlocking screen is displayed, the control device 30 performs control such that the locking device 13 is unlocked in order to open the door 12 of the box 11 or 11*a* in which luggage is deposited, and when the door 12 is closed thereafter, the locking device 13 is locked.

Figure 24:
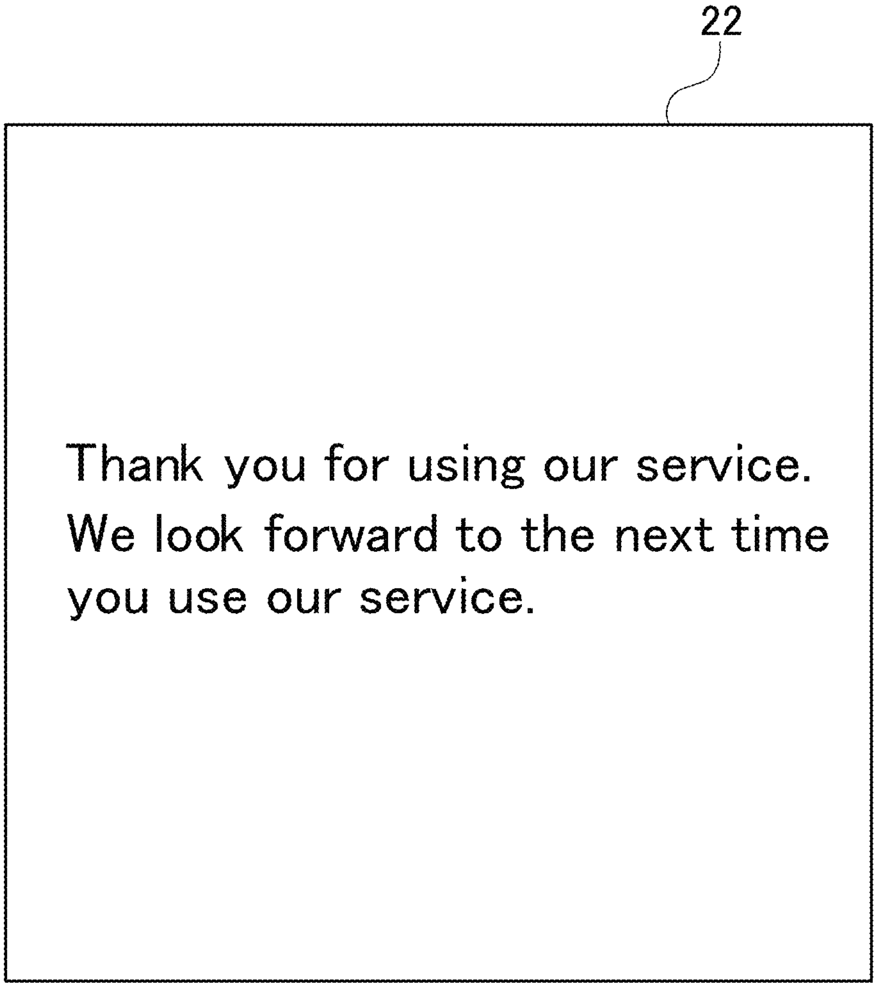
FIG. 24 shows an end screen displayed on the display unit when the user taps the take-out button by mistake instead of the reopening door button, according to the first embodiment.

After the door 12 of the box 11 from which the user has taken out the luggage is locked, the control device 30 causes the display of the display unit 22 to transition to an "end screen" shown in FIG. 24. An explanation text "Thank you for using our service. We look forward to the next time you use our service." is displayed in the middle part of the end screen. Then, the control device 30 returns the display of the display unit 22 to the standby screen shown in FIG. 3.

(Action and Effects of Locker Apparatus)

With the configuration of the locker apparatus 1 of this embodiment described above, in the operation of the reopening door mode described above, when the reopening door button 63 is operated within the predetermined time ("within 15 minutes" in this embodiment) after luggage is deposited in the box 11 or 11*a*, the door 12 is closed, and the locking device 13 is locked once, the control device 30 unlocks the locking device 13, on a condition that authentication of the user by the authentication means (the display unit 22, the QR code reader 23, and the settlement terminal 24) of the operation unit 20 is established, in order to permit the door 12 to be reopened, and the control device 30 locks the locking device 13 again when the door 12 is closed thereafter.

Therefore, for example, when the user takes out luggage or the like unintentionally left in the box 11 or 11*a* or redeposits luggage immediately after depositing luggage in the box 11 or 11*a*, reopening of the door 12 by unlocking and locking after the door 12 is closed again are performed, without paying a usage fee, on the condition that the reopening door button 63 is operated within the predetermined time and authentication of the user is established. Thus, immediately after the operation for depositing luggage is completed, redeposit of luggage, etc., can be performed without forcing the user to bear the burden of a new usage fee.

With the configuration of this embodiment, on the standby screen shown in FIG. 3, the deposit button 61 and the take-out button 62 as the virtual buttons 60 are displayed side by side, and the reopening door button 63 is placed adjacent to the upper side of the take-out button 62 and is smaller in size than the take-out button 62. Here, the deposit button 61 which is frequently used is used for an operation in depositing luggage, and the take-out button 62 which is frequently used is used for an operation in taking out luggage, so that the uses of the deposit button 61 and the take-out button 62 are different from each other, and there is little risk of selecting a wrong button at the time of operation. In contrast, although the reopening door button 63 is used less frequently, the reopening door button 63 is used for an operation in redepositing luggage, and the use thereof is similar to that of the take-out button 62, so that there is a risk of selecting a wrong button from the reopening door button 63 and the take-out button 62 at the time of operation. With the above configuration, since the reopening door button 63 is placed adjacent to the upper side of the take-out button 62 and is smaller in size than the take-out button 62, the take-out button 62 is more conspicuous than the reopening door button 63 and is easily distinguished from the reopening door button 63, so that there is less risk of selecting a wrong button when operating one of these buttons. Therefore, it is possible to reduce a situation in which the user selects and operates a wrong one out of the reopening door button 63 and the take-out button 62 and performs operation from the beginning.

With the configuration of this embodiment, when the reopening door button 63 is operated on the standby screen shown in FIG. 3, the display of the display unit 22 transitions from the standby screen to the confirmation screen shown in FIG. 4, and an explanation text "You can redeposit luggage within a predetermined time after deposit", and the elapsed time after the deposit are displayed on this confirmation screen. Accordingly, the user can check the content of the selected operation and the remaining time for which the operation is possible. Therefore, after the reopening door button 63 is operated, the user can be prompted to complete redeposit of luggage or the like within the predetermined time, so that it is possible to reduce a mistake of the user trying to continue operation.

With the configuration of this embodiment, when the confirmation button 69 is operated on the confirmation screen shown in FIG. 4, the display of the display unit 22 transitions from the confirmation screen to the authentication selection screen shown in FIG. 5, and a text "Redeposit luggage" is displayed on the authentication selection screen, so that the user can confirm that the user has shifted to an operation such as redeposit of luggage, rather than take-out of luggage. In addition, since the plurality of types of authentication buttons 71 to 73 for selecting one of the plurality of authentication methods are displayed, the user's operation for entering an authentication method is simplified. Therefore, after operating the confirmation button 69, the user can select an authentication method in a short time.

With the configuration of this embodiment, when one of the authentication buttons 71 to 73 is operated, the display of the display unit 22 transitions from the authentication selection screen shown in FIG. 5 to one of the authentication execution screens shown in FIG. 6 to FIG. 8, the authentication means (ten-key button 75) or the illustration prompting an operation on the authentication means (the QR code reader 23, the settlement terminal 24, etc.) corresponding to the selected one authentication method and the explanation text therefor are displayed on the authentication execution screen, so that it becomes easier for the user to perform the operation for performing authentication. Therefore, after operating the authentication buttons 71 to 73, the user can perform authentication in a short time.

With the configuration of this embodiment, when the authentication means (the QR code reader 23, the settlement terminal 24, etc., and the ten-key button 75) on the authentication execution screens shown in FIG. 6 to FIG. 8 is operated, the display of the display unit 22 transitions from the authentication execution screen to the box selection screen shown in FIG. 9 and FIG. 10, and the number corresponding to each box 11 or 11*a* in which the user has deposited luggage and the selection button 80 that can be operated to select this number are displayed on the box selection screen, so that it becomes easier for the user to select the box 11 or 11*a* in which the user has deposited luggage. In addition, since the operation that should be performed by the user on the lever 14 after the user deposits luggage again (redeposits luggage) is prompted with an illustration, the user is prevented from forgetting to operate the lever 14, and is prevented from forgetting to close and lock the door 12. Therefore, the user can specify the box 11 or 11*a* in which the user is to redeposit luggage, in a short time, and can more assuredly lock the door 12 of this box 11 or 11*a* after redepositing luggage.

With the configuration of this embodiment, when the lever 14 is operated, the display of the display unit 22 transitions from the box selection screen shown in FIG. 9 and FIG. 10 to the end screen shown in FIG. 11, and the text "Thank you for using our service" is displayed on the end screen, so that the user is notified of the end of redeposit of luggage. Therefore, the user can confirm the completion of the operation for redepositing luggage.

With the configuration of this embodiment, the predetermined time for permitting the door 12 to be reopened is 15 minutes after the locking device 13 is locked once. This 15-minute period can be a sufficient time for taking out items, etc., left behind and for redepositing luggage. Therefore, it is possible to provide the user of the locker apparatus 1 with a convenience that is effective in terms of time.

With the configuration of this embodiment, the control device 30 is configured to permit the door 12 to be reopened multiple times within the predetermined time. Accordingly, it is possible to redeposit luggage multiple times as needed by the user. Therefore, it is possible to provide the user of the locker apparatus 1 with a convenience that is effective in terms of the number of times.

With the configuration of this embodiment, if there are a plurality of boxes 11 and 11*a* in which the same user has deposited luggage, the control device 30 unlocks the locking device 13 corresponding to only the box 11 or 11*a* selected through an operation on the operation unit 20. Therefore, if there are a plurality of boxes 11 and 11*a* in which the same user has deposited luggage, through an operation on the operation unit 20, the locking device 13 corresponding to only the selected box 11 or 11*a* is unlocked, so that it is possible to limit redeposit of luggage to only the specific box 11 or 11*a*. Thus, it is possible to provide the user of the locker apparatus 1 with an effective convenience without any loss of operation.

Second Embodiment

Next, a second embodiment will be described. In the following description, the components that are equivalent to those of the first embodiment are designated by the same reference characters, the description thereof is omitted, and the differences will be mainly described.

This embodiment is different from the first embodiment in the content of the transition screen displayed on the display unit 22 when the "reopening door mode" is executed. That is, in the first embodiment, the reopening door button 63 is displayed on the standby screen shown in FIG. 3. In contrast, in this embodiment, instead of the standby screen shown in FIG. 3, another "standby screen" shown in FIG. 25 and a "reopening door confirmation screen" shown in FIG. 26 are provided.

Figure 25:
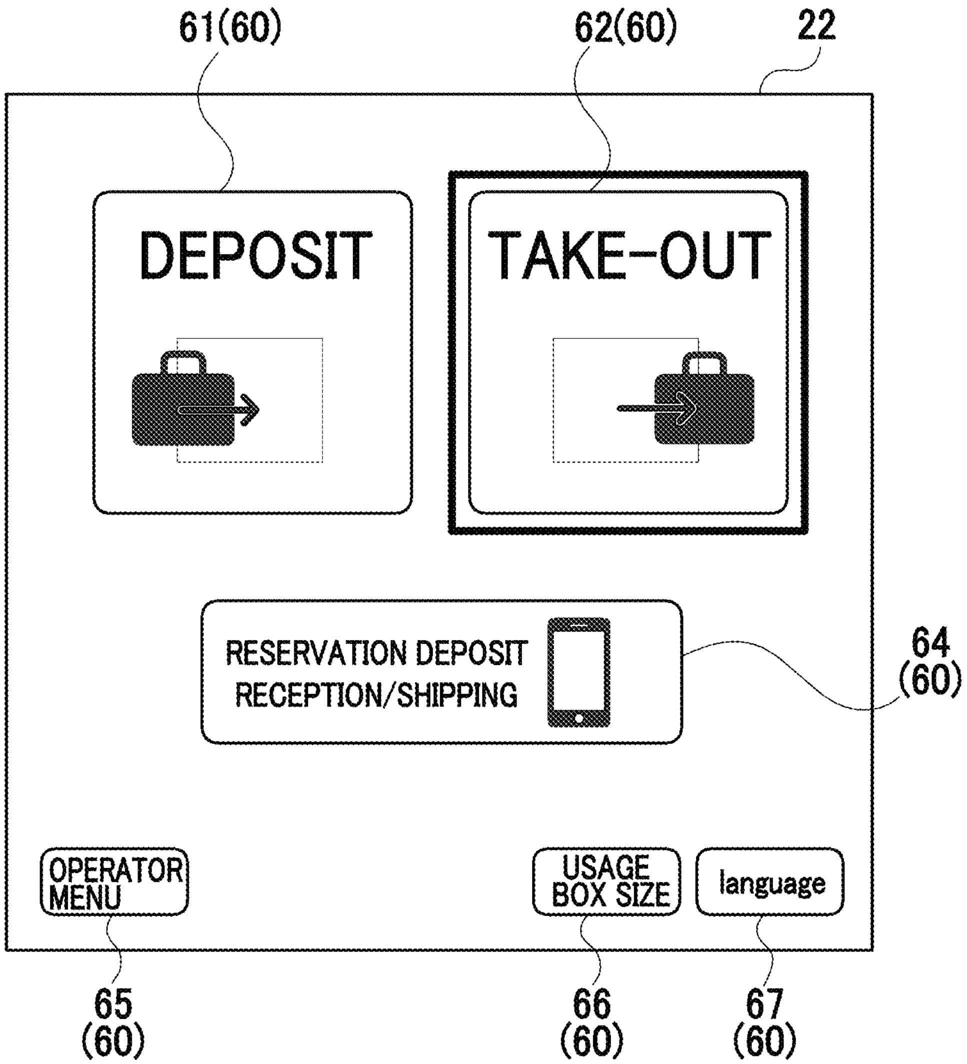
FIG. 25 shows a standby screen displayed on a display unit when a reopening door mode is executed, according to a second embodiment.
Figure 26:
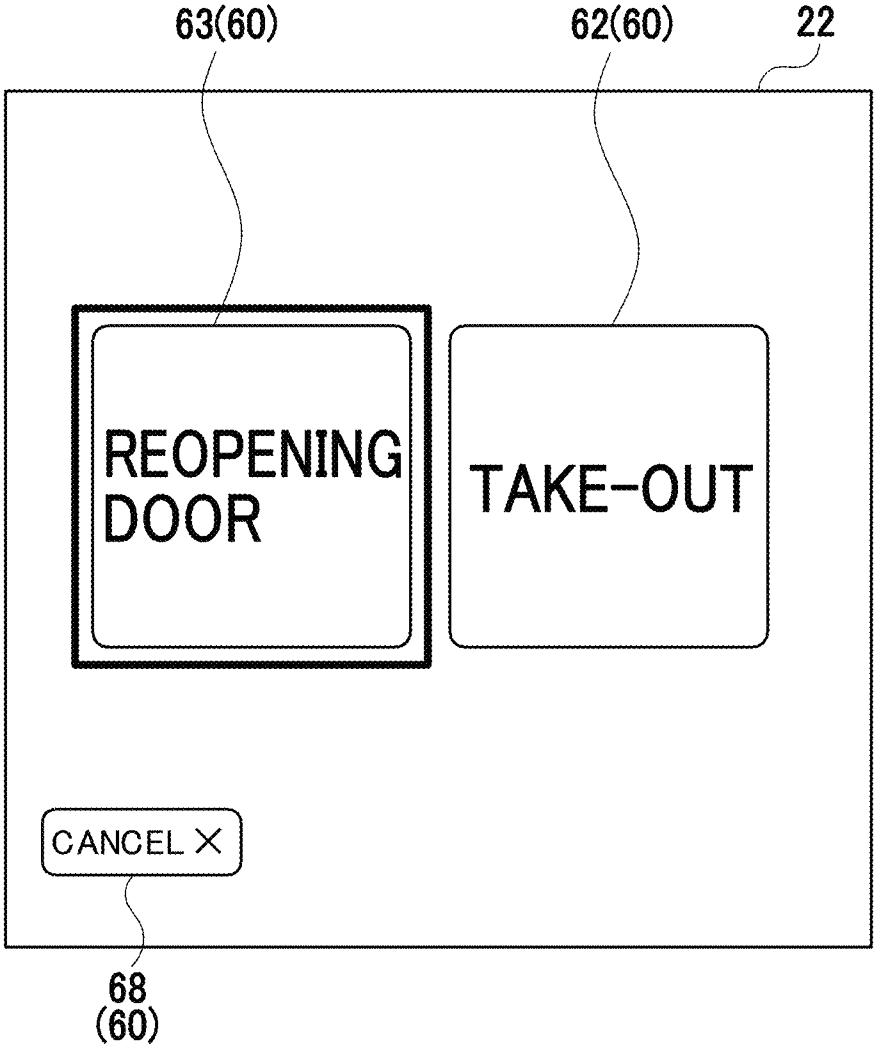
FIG. 26 shows a reopening door confirmation screen displayed on the display unit when the reopening door mode is executed, according to the second embodiment.

Here, on the standby screen shown in FIG. 25, a deposit button 61 and a take-out button 62 are displayed side by side in the same size, and a reopening door button is not displayed above the take-out button 62. The other virtual buttons 60 are the same as those on the standby screen shown in FIG. 3. In addition, a reopening door button 63 and a take-out button 62 are displayed side by side in the same size in the middle part of the reopening door confirmation screen shown in FIG. 26, and only a cancellation button 68 is displayed in the lower part of the same screen.

With the configuration of this embodiment, since a reopening door button is not displayed on the standby screen and the reopening door button 63 is displayed on the reopening door confirmation screen to which a transition is made next, the user can avoid operating a wrong button out of the take-out button 62 for taking out luggage and the reopening door button 63 for redepositing luggage, etc., on the standby screen, and can reconfirm the existence of the reopening door button 63 and its function on the next reopening door confirmation screen.

Other Embodiments

The disclosed technique is not limited to the above embodiments, and can also be implemented by changing part of the components as appropriate without departing from the scope of the gist of the disclosed technique.

(1) In the above embodiments, for the locker apparatus 1, it is assumed that the user who deposits luggage and the user who takes out luggage are the same person. In contrast, it is also possible to assume that the user who deposits luggage and the user who takes out luggage are different persons. More specifically, in recent years, the idea of using railroad stations as logistics bases has become more widespread, so that it is conceivable that the user who deposits luggage is a transport business operator who delivers commodities ordered by a general consumer, and the user who takes out luggage is the general consumer who had ordered the commodities. In this case, for example, a specific transport business operator is allowed to use the locker apparatus 1, and after the transport business operator is authenticated using the operation unit 20, the deposit program 32*a* is activated. For authentication in taking out luggage, for example, a private code for authentication such as a QR code (registered trademark) for authentication may be transmitted to a mobile terminal or the like of the general consumer, and after the private code is authenticated, the take-out program 32*b* may be activated.

(2) In the above embodiments, as an example, the disclosed technique is embodied in the locker apparatus 1 installed on the premises of a station, but is not limited thereto, and, for example, a home delivery box installed in a housing complex or the like may be adopted.

The disclosed technique can be used, for example, for a locker apparatus installed on the premises of a station.

REFERENCE SIGNS LIST

1 Locker apparatus
11 Box
11*a* Small box
12 Door
13 Locking device
14 Lever (operation member)
20 Operation unit
22 Display unit (authentication member)
23 QR code reader (authentication member)
24 Settlement terminal (authentication member)
30 Control device
63 Reopening door button
72 QR code button (authentication button)

73 Number entry button (authentication button)
75 Ten-key button (authentication button)
80 Selection button

What is claimed is:

1. A locker apparatus comprising:
a box capable of accommodating luggage therein;
a door configured to open and close the box;
a locking device configured to unlockably lock the door;
an operation unit configured to receive an operation by a user; and
a control device configured to control the locking device in response to an operation on the operation unit by the user, wherein
the operation unit includes an authentication member configured to authenticate the user,
the control device is configured to lock the locking device in order to lock the door into a closed state except when the luggage is deposited in the box and when the luggage is taken out from the box,
the operation unit includes a reopening door button that can be operated by the user in order to give an instruction to reopen the door,
when the reopening door button is operated within a predetermined time after the luggage is deposited in the box, the door is closed, and the locking device is locked once, the control device unlocks the locking device, on a condition that authentication of the user by the authentication member is established, in order to permit the door to be reopened, and locks the locking device again when the door is closed thereafter,
the operation unit includes a display unit configured to display at least one of a virtual button, an illustration of a locker apparatus, and a text,
the control device is configured to cause a screen of the display unit to sequentially transition from a standby screen in response to an operation on the virtual button by the user,
as the virtual button, a deposit button that is operated by the user when the user deposits the luggage in the box, a take-out button that is operated by the user when the user takes out the luggage from the box, and the reopening door button are displayed on the standby screen, and
on the standby screen, the reopening door button is smaller in size than the take-out button.

2. The locker apparatus according to claim 1, wherein the predetermined time for permitting the door to be reopened is 15 minutes after the locking device is locked once.

3. The locker apparatus according to claim 1, wherein the control device is configured to permit the door to be reopened multiple times within the predetermined time.

4. The locker apparatus according to claim 1, wherein,
the box includes a plurality of boxes, and
when the luggage has been deposited in the plurality of boxes by the same user, the control device unlocks the locking device corresponding to only the box selected from the plurality of boxes through an operation on the operation unit.

5. A locker apparatus comprising:
a box capable of accommodating luggage therein;
a door configured to open and close the box;
a locking device configured to unlockably lock the door;
an operation unit configured to receive an operation by a user; and
a control device configured to control the locking device in response to an operation on the operation unit by the user, wherein
the operation unit includes an authentication member configured to authenticate the user,
the control device is configured to lock the locking device in order to lock the door into a closed state except when the luggage is deposited in the box and when the luggage is taken out from the box,
the operation unit includes a reopening door button that can be operated by the user in order to give an instruction to reopen the door,
when the reopening door button is operated within a predetermined time after the luggage is deposited in the box, the door is closed, and the locking device is locked once, the control device unlocks the locking device, on a condition that authentication of the user by the authentication member is established, in order to permit the door to be reopened, and locks the locking device again when the door is closed thereafter,
the operation unit includes a display unit configured to display at least one of a virtual button, an illustration of a locker apparatus, and a text,
the control device is configured to cause a screen of the display unit to sequentially transition from a standby screen in response to an operation on the virtual button by the user,
as the virtual button, a deposit button that is operated by the user when the user deposits the luggage in the box, a take-out button that is operated by the user when the user takes out the luggage from the box, and the reopening door button are displayed on the standby screen,
the reopening door button is a button that is operated by the user when the user redeposits the luggage in the box, not when the user takes out the luggage from the box, and
on the standby screen, the deposit button and the take-out button are displayed side by side, and the reopening door button is placed adjacent to an upper side of the take-out button and is smaller in size than the take-out button.

6. The locker apparatus according to claim 5, wherein
when the reopening door button is operated, the control device causes a display of the display unit to transition from the standby screen to a confirmation screen, and
an explanation text "You can redeposit luggage within a predetermined time after deposit", an elapsed time after the deposit, and a confirmation button as the virtual button are displayed on the confirmation screen.

7. The locker apparatus according to claim 6, wherein
when the confirmation button is operated, the control device causes the display of the display unit to transition from the confirmation screen to an authentication selection screen, and
a text "Redeposit luggage" and a plurality of types of authentication buttons for selecting one of a plurality of authentication methods are displayed on the authentication selection screen.

8. The locker apparatus according to claim 7, wherein
when one of the authentication buttons is operated, the control device causes the display of the display unit to transition from the authentication selection screen to an authentication execution screen, and
the authentication member or an illustration prompting an operation on the authentication member corresponding to the selected one authentication method, and an explanation text therefor are displayed on the authentication execution screen.

9. The locker apparatus according to claim 8, wherein the door is provided with an operation member that is operated by the user in order to request the locking device to lock when the user has deposited the luggage in the box and has closed the door, when the authentication member is operated, the control device causes the display of the display unit to transition from the authentication execution screen to a box selection screen, and a number corresponding to the box in which the user has deposited the luggage, a selection button that can be operated in order to select the number, an explanation text prompting an operation on the operation member after the luggage is deposited again, and an illustration for the operation on the operation member are displayed on the box selection screen.

10. The locker apparatus according to claim 9, wherein when the operation member is operated, the control device causes the display of the display unit to transition from the box selection screen to an end screen, and a text "Thank you for using our service" is displayed on the end screen.

11. The locker apparatus according to claim 6, wherein the predetermined time for permitting the door to be reopened is 15 minutes after the locking device is locked once.

12. The locker apparatus according to claim 6, wherein the control device is configured to permit the door to be reopened multiple times within the predetermined time.

13. The locker apparatus according to claim 9, wherein, the box includes a plurality of boxes, when the luggage has been deposited in the plurality of boxes by the same user, the control device unlocks the locking device corresponding to only the box selected from the plurality of boxes through an operation on the operation unit.

* * * * *